US011893958B2

(12) United States Patent
Tokuchi

(10) Patent No.: US 11,893,958 B2
(45) Date of Patent: Feb. 6, 2024

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 463 days.

(21) Appl. No.: 17/061,096

(22) Filed: Oct. 1, 2020

(65) Prior Publication Data

US 2021/0335320 A1 Oct. 28, 2021

(30) Foreign Application Priority Data

Apr. 22, 2020 (JP) ................................ 2020-076185

(51) Int. Cl.
*G09G 5/10* (2006.01)
*G09G 5/00* (2006.01)

(52) U.S. Cl.
CPC ............... *G09G 5/10* (2013.01); *G09G 5/005* (2013.01); *G09G 2320/0626* (2013.01); *G09G 2320/0686* (2013.01); *G09G 2320/08* (2013.01); *G09G 2380/02* (2013.01)

(58) Field of Classification Search
CPC ............ G09G 5/10; G09G 5/005; G09G 5/14; G09G 2320/0626; G09G 2320/0686; G09G 2320/08; G09G 2320/0261; G09G 2380/02; G09G 2330/021; G09G 2330/022; G09G 2354/00
See application file for complete search history.

(56) References Cited

U.S. PATENT DOCUMENTS

2011/0261087 A1* 10/2011 Bahk ........................ G09G 5/00 345/690
2014/0298252 A1* 10/2014 Choi .................. G06F 3/04886 715/788
2016/0085319 A1* 3/2016 Kim .................... H04M 1/0268 345/156
2016/0148554 A1* 5/2016 Lim ......................... G09G 3/20 345/694
2018/0082632 A1* 3/2018 Lee ...................... G09G 3/3233

FOREIGN PATENT DOCUMENTS

JP 2011-524018 A 8/2011
JP 2017-142340 A 8/2017

* cited by examiner

*Primary Examiner* — Brent D Castiaux
(74) *Attorney, Agent, or Firm* — Oliff PLC

(57) ABSTRACT

An information processing device includes a processor configured to receive a brightness setting for each region of a deformable continuous display surface through a user instruction.

16 Claims, 36 Drawing Sheets

1A
FIG. 20A
FIG. 20B
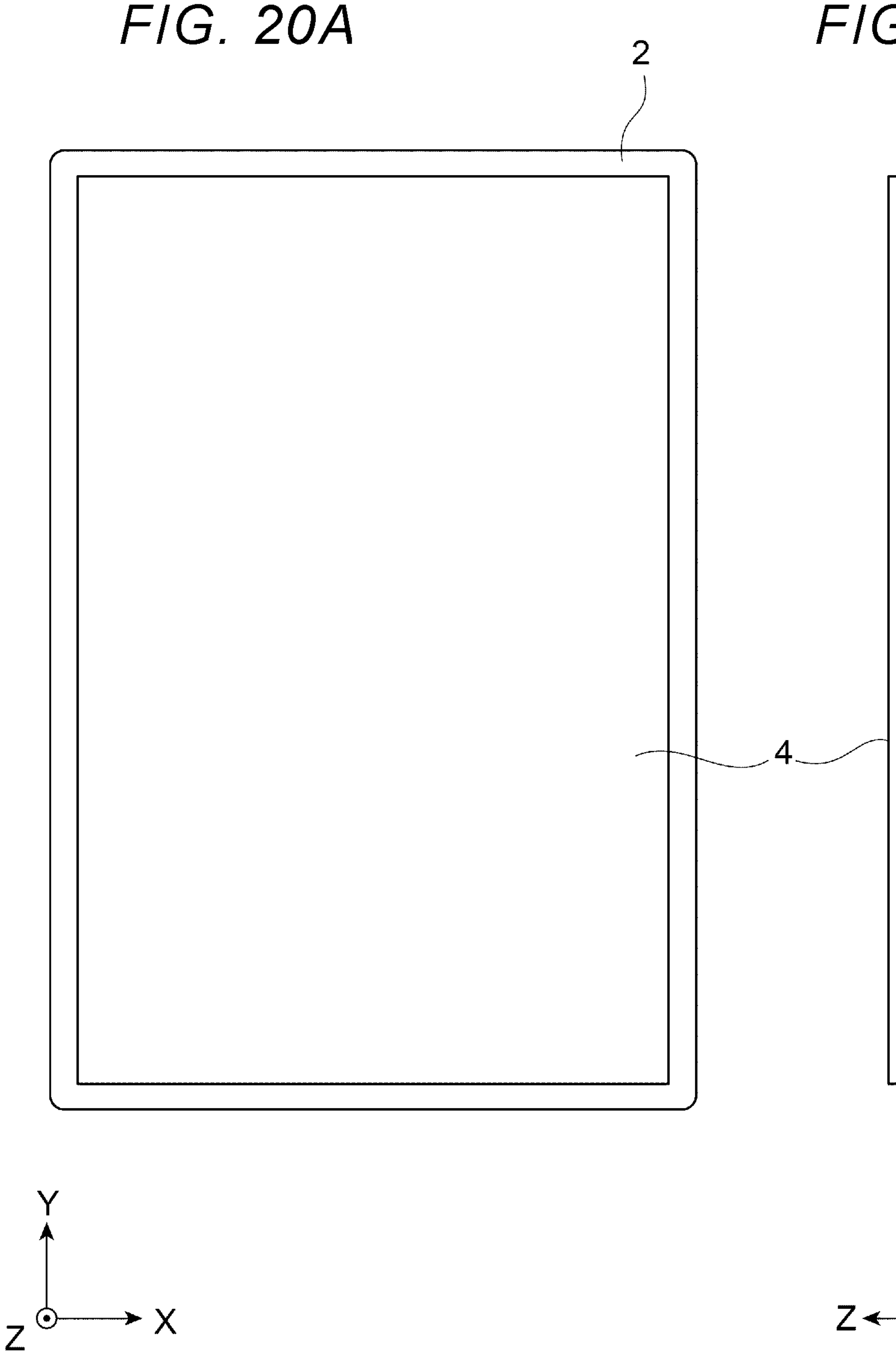
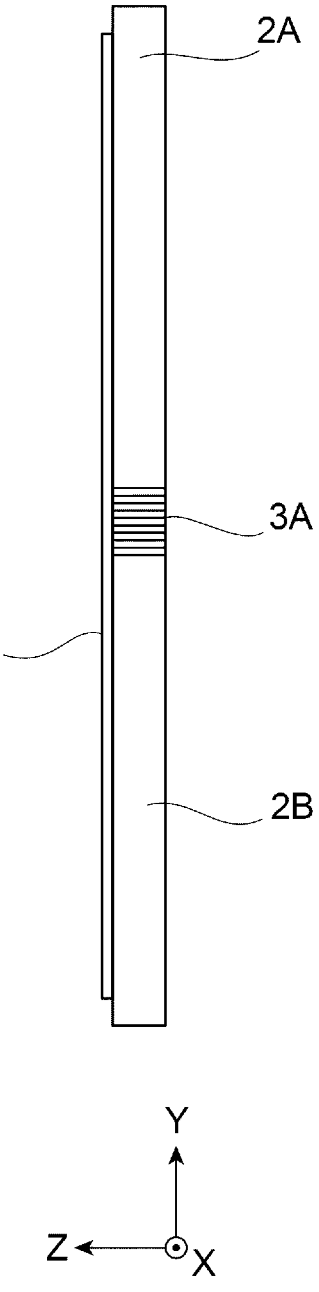

1E

1F

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-076185 filed Apr. 22, 2020.

BACKGROUND

1. Technical Field

The present disclosure relates to an information processing device and a non-transitory computer readable medium.

2. Related Art

JP-A-2017-142340 aims at saving power consumption of a so-called flexible display and discloses a technique of controlling brightness of a display region in accordance with a degree of bending of the display region detected by a detector.

SUMMARY

However, in a method of uniformly controlling the brightness in accordance with the degree of bending, brightness after the control may not suit a way in which a user uses the flexible display. For example, in a case where the flexible display is mountain-folded and one surface of the flexible device is placed on a table or the like, the technique disclosed in JP-A-2017-142340 controls the surface placed on the table so as to have the same brightness as a display surface unless the degree of bending exceeds a threshold.

Aspects of non-limiting embodiments of the present disclosure relate to setting brightness of a display region in accordance with a user instruction as compared with a case where one surface of the display region is controlled uniformly.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to receive a brightness setting for each region of a deformable continuous display surface through a user instruction.

BRIEF DESCRIPTION OF THE DRAWINGS

Exemplary embodiment(s) of the present disclosure will be described in detail based on the following figures, wherein:

FIG. 1A is a front view of the information terminal, and FIG. 1B is a side view of the information terminal;

FIG. 2A illustrates a case where the information terminal is used in a flat state, FIG. 2B illustrates a case where the information terminal is used in a state of being bent at approximately 90°, and FIG. 2C illustrates a case where the information terminal is used in a folded state;

FIG. 3A illustrates a usage method in which a user views the entire display surface in the state where the information terminal is bent at approximately 90°, FIG. 3B illustrates a usage method in which the information terminal is disposed so that a hinge (not illustrated) of the information terminal bent at approximately 90° is on a top and the user views approximately half of the display surface, and FIG. 3C illustrates a usage method in which approximately half of the display surface of the information terminal bent at approximately 90° is placed on a plate surface (not illustrated) and the user views approximately half of the display surface;

FIG. 15A illustrates an example of a setting made by the user for each region, and FIG. 15B illustrates an example of controlling the brightness of each region of a touch panel during use;

FIG. 16A illustrates an example of a setting made by the user for each region, and FIG. 16B illustrates an example of controlling the brightness of each region of the touch panel during use;

FIG. 17A illustrates an example of a setting made by the user for each region, and FIG. 17B illustrates an example of controlling the brightness of each region of the touch panel during use;

FIG. 18A illustrates an example of a setting made by the user for each region, and FIG. 18B illustrates an example of controlling the brightness of each region of the touch panel during use;

FIG. 19A illustrates an example of a setting made by the user for each region, and FIG. 19B illustrates an example of controlling the brightness of each region of the touch panel during use;

FIGS. 20A and 20B are diagrams illustrating an example of an external configuration of an information terminal used in a second exemplary embodiment, FIG. 20A is a front view of the information terminal, and FIG. 20B is a side view of the information terminal;

FIG. 21A illustrates a case where the information terminal is used in a flat state, and FIG. 21B illustrates a case where the information terminal is used in a state of being bent at approximately 90°;

FIG. 23A illustrates an example of a setting made by the user for each region, and FIG. 23B illustrates an example of controlling the brightness of each region of a touch panel during use;

FIG. 24A illustrates an example of a setting made by the user for each region, and FIG. 24B illustrates an example of controlling the brightness of each region of the touch panel during use;

FIG. 25A is a front view of the information terminal, and FIG. 25B is a side view of the information terminal;

FIG. 26A illustrates a case where the information terminal is used in a flat state, and FIG. 26B illustrates a case where the information terminal is used in a state of being curved in the vicinity of an approximate center of a long side of the information terminal;

FIG. 27A illustrates a case where the information terminal is used in a flat state, FIG. 27B illustrates a case where the information terminal is used in a state of being curved into a C shape, and FIG. 27C illustrates a case where the information terminal is used in a state of being curved in an approximately cylindrical shape;

FIG. 31A is a front view of the information terminal, FIG. 31B is a side view of the information terminal, and FIG. 31C is a diagram illustrating an example of a shape of the deformed information terminal;

FIG. 32A illustrates a state where a touch panel is folded at a position of a hinge so that the touch panel is located on a ridge side, and FIG. 32B illustrates a state where the touch panel is folded at a position of a hinge so that the touch panel is located on a valley side;

FIG. 34A is a front view of the information terminal, FIG. 34B is a side view of the information terminal, and FIG. 34C is a diagram illustrating an example of a shape of the deformed information terminal;

FIG. 35B is diagrams illustrating a usage example in which the keyboard is disposed on a display surface of the information terminal; FIG. 36A is a front view of the information terminal, and FIG. 36B is a side view of the information terminal.

DETAILED DESCRIPTION

Exemplary embodiments of the present disclosure will be described below with reference to the drawings.

First Exemplary Embodiment

Configuration of Device

Figure 1A:
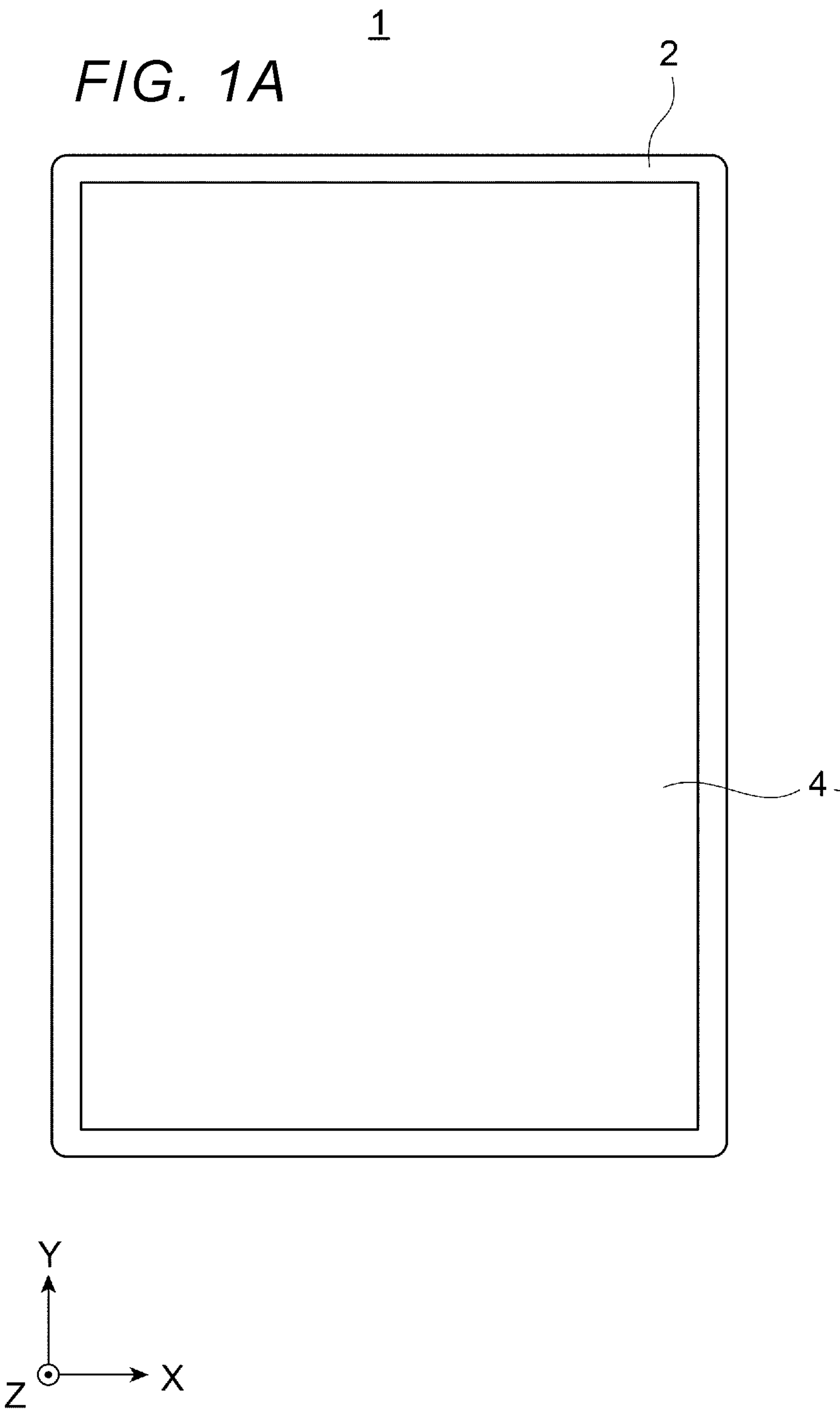
FIGS. 1A and 1B are diagrams illustrating an example of an external configuration of an information terminal used in a first exemplary embodiment.
Figure 1B:
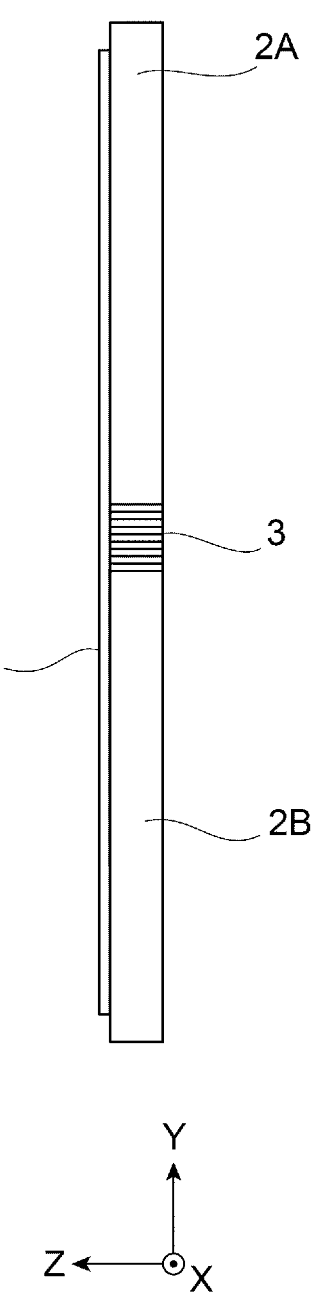

FIGS. 1A and 1B are diagrams illustrating an example of an external configuration of an information terminal 1 used in a first exemplary embodiment. FIG. 1A is a front view of the information terminal 1. FIG. 1B is a side view of the information terminal 1. The information terminal 1 is an example of an information processing device.

The information terminal 1 illustrated in FIGS. 1A and 1B is assumed to be, for example, a tablet computer or a smartphone.

A body 2 of the information terminal 1 according to the present exemplary embodiment includes two body panels 2A and 2B. Components (not illustrated) that enable the information terminal 1 to operate as a computer are built in the two body panels 2A and 2B. The two body panels 2A and 2B are coupled to each other via a hinge 3. The hinge 3 used in the present exemplary embodiment includes plural members that are coupled to each other in a direction of a long side of the information terminal 1. The hinge 3 is deformed by gradually changing an attachment angle between adjacent members. The deformation of the hinge 3 allows the information terminal 1 to be deformed into a bent shape or deformed into a folded shape. A structure of the hinge 3 that implements the bending or the folding of the information terminal 1 is known.

One touch panel 4 including a deformable display surface is provided on a surface of the body 2. In the present exemplary embodiment, the touch panel 4 includes an organic electro luminescent (EL) display in which light emitting elements are arranged on a film-shaped plastic substrate, and a film-shaped sensor (hereinafter referred to as "film sensor") provided on a surface of the organic EL display. The film sensor has transparency that does not hinder observation of an image displayed on the organic EL display. The film sensor detects a position where a user operates by, for example, a capacitive touch-sensing system. The organic EL display according to the present exemplary embodiment is an example of a deformable continuous display surface. In other words, the organic EL display has a display surface formed on one plastic substrate.

Example of Changes of Shape of Information Terminal 1

Figure 2A:
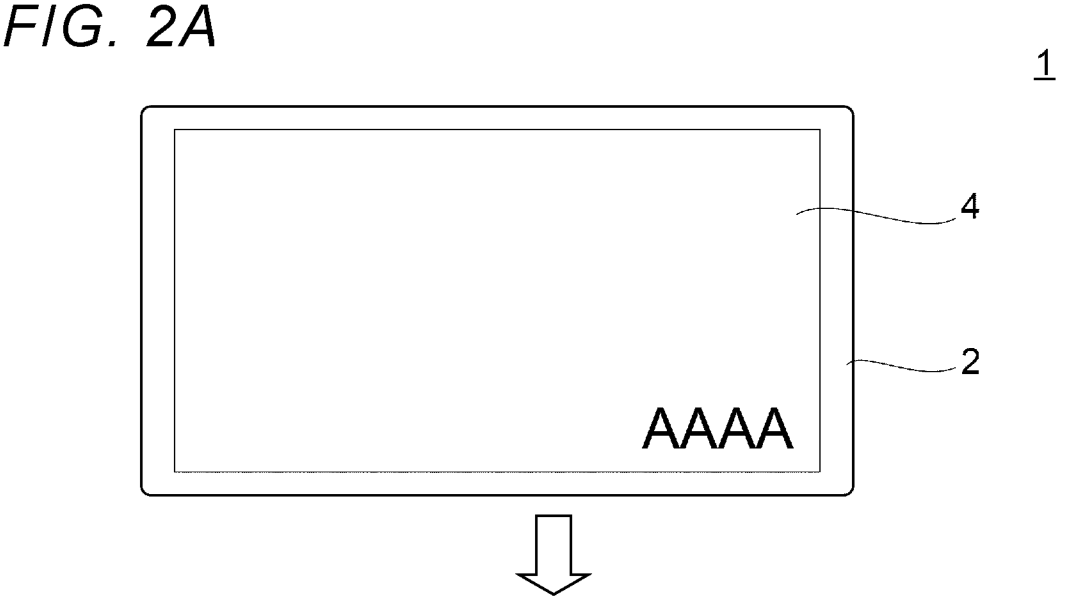
FIGS. 2A to 2C are diagrams illustrating examples of changes in a shape of the information terminal according to the first exemplary embodiment.
Figure 2B:
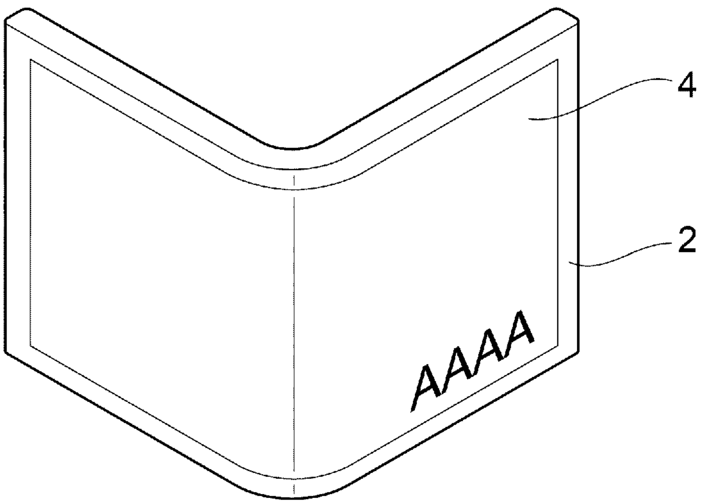
Figure 2C:
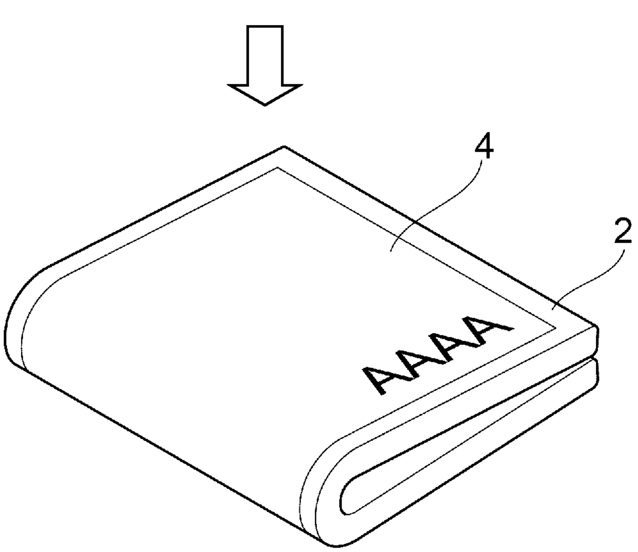

FIGS. 2A to 2C are diagrams illustrating examples of changes in a shape of the information terminal 1 according to the first exemplary embodiment. FIG. 2A illustrates a case where the information terminal 1 is used in a flat state. FIG. 2B illustrates a case where the information terminal 1 is used in a state of being bent at approximately 90°. FIG. 2C illustrates a case where the information terminal 1 is used in a folded state.

The shapes illustrated in FIGS. 2A to 2C are representative shapes of the information terminal 1. The information terminal 1 may take an intermediate bending angle shape between the shapes illustrated in FIGS. 2A and 2B. Similarly, the information terminal 1 may take an intermediate bending angle shape between the shapes illustrated in FIGS. 2B and 2C.

Usage Examples of Information Terminal 1

Figures 3A, 3B, 3C:
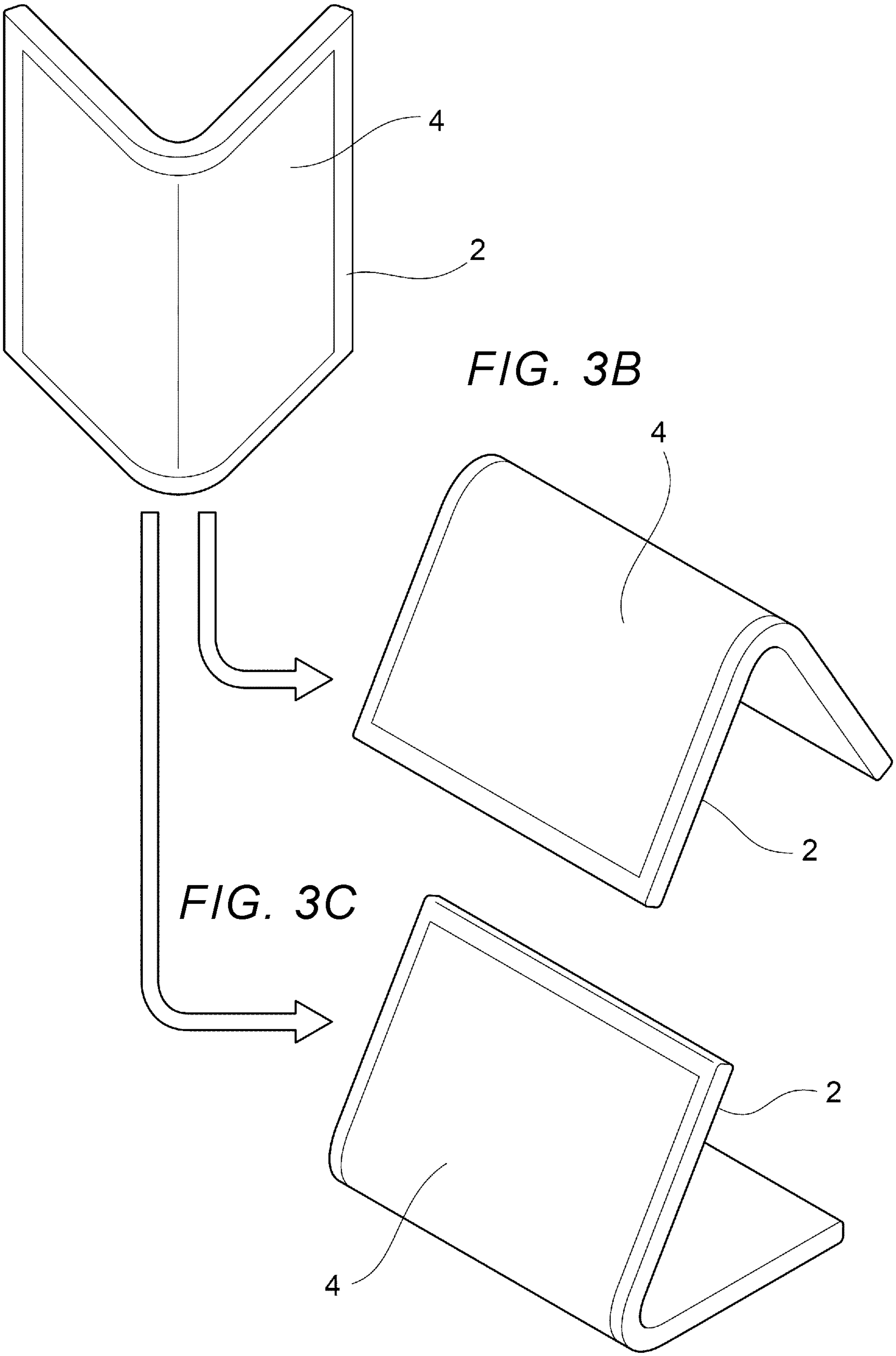
FIGS. 3A to 3C are diagrams illustrating usage examples of the information terminal according to the first exemplary embodiment.

FIGS. 3A to 3C are diagrams illustrating usage examples of the information terminal 1 according to the first exemplary embodiment. FIG. 3A illustrates a usage method in which the user views the entire display surface in the state where the information terminal 1 is bent at approximately 90°. FIG. 3B illustrates a usage method in which the information terminal 1 is disposed so that a hinge 3 (not illustrated in FIG. 3B; see FIGS. 1A and 1B) of the information terminal 1 bent at approximately 90° is on a top and the user views approximately half of the display surface. FIG. 3C illustrates a usage method in which approximately half of the display surface of the information terminal 1 bent at approximately 90° is placed on a plate surface (not illustrated in FIG. 3C) and the user views approximately half of the display surface.

In the present exemplary embodiment, the term "display surface" refers to a region, where an image can be displayed, in the organic EL display constituting the touch panel 4. In other words, the display surface includes not only a region where pixels are turned on, but also a region where pixels are turned off.

The display surface includes not only a region that can be observed by the user, but also a region where the image is not observed by the user and a region where it is difficult for the user to observe. The region where the image is not observed by the user includes, for example, (i) a region not illustrated in FIGS. 3A to 3C during the usage methods of FIGS. 3B and 3C, and (ii) a region where the display surface is covered with another object. For example, when an angle between a direction of a normal of the display surface and a direction of a line of sight of the user is approximately 90°, in other words, a region where the line of sight of the user is close to parallel to the display surface is included in the region difficult for the user to observe.

Hardware Configuration

Figure 4:
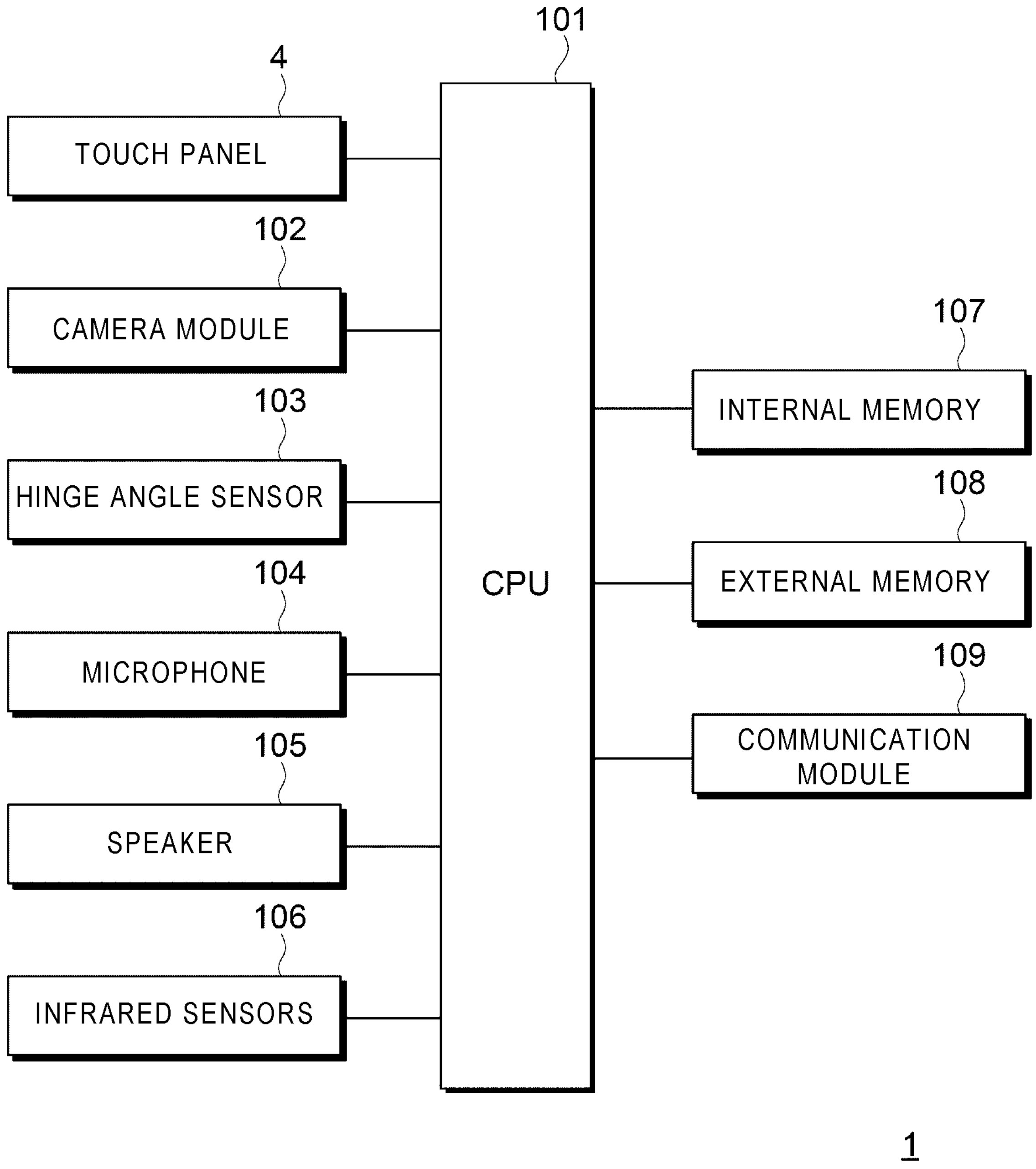
FIG. 4 is a diagram illustrating an example of a hardware configuration of the information terminal.

FIG. 4 is a diagram illustrating an example of a hardware configuration of the information terminal 1.

The information terminal 1 used in the present exemplary embodiment includes a central processing unit (CPU) 101 that controls each unit by executing a program, the touch panel 4, a camera module 102, a hinge angle sensor 103 that detects an opening angle of the hinge 3 (see FIGS. 1A and 1B), a microphone 104 used for calls and recordings, a speaker 105 used to reproduce a sound, infrared sensors 106 used to detect a part that is in contact with another part, an internal memory 107 that stores system data and internal data, a detachable external memory 108, and a communication module 109 used for communication with an external device. The internal memory 107 and the external memory 108 are both non-volatile semiconductor memories.

The CPU 101 according to the present exemplary embodiment implements various functions by executing the program (hereinafter also referred to as an "app") stored in the internal memory 107. The CPU 101 and the internal memory 107 constitute a computer. The CPU 101 serves as an example of a receiver and also an example of a controller.

The hinge angle sensor 103 outputs information on an angle between the body panel 2A and the body panel 2B when the body 2 is deformed around the hinge 3. In other words, the hinge angle sensor 103 outputs a bending angle of the information terminal 1 at the hinge 3 (see FIGS. 1A and 1B). The bending angle may be specified based on a rotation angle of gears constituting the hinge 3.

The infrared sensors 106 are disposed in portions of the body panels 2A and 2B that are peripheral to the touch panel 4. The infrared sensors 106 are also disposed on both of the body panel 2A and the body panel 2B.

For example, when the body panel 2A is placed on a surface such as a desk, the infrared sensor 106 provided on the body panel 2A detects infrared light that is emitted from a light source and reflected. A light receiving sensor is used to detect the reflected light. In the present exemplary embodiment, a case where the infrared light which is emitted from the light source and is reflected is detected refers to a case where an intensity of the infrared rays detected with the light receiving sensor is equal to or higher than a threshold. The intensity of the infrared rays used in this determination may be an average value of detection values of plural light receiving sensors.

For example, when the body panel 2B is placed on a surface such as a desk, the infrared sensor 106 provided on the body panel 2B detects infrared light that is emitted from the light source and reflected.

When a surface on which the infrared sensors 106 are disposed can be folded inward, both the infrared sensor 106 provided on the body panel 2A and the infrared sensor 106 provided on the body panel 2B detect reception of the infrared rays.

When the plural infrared sensors 106 are also disposed in a region inside the display surface, a region in the display surface that is covered with another object can be individually detected.

Brightness Setting

A brightness setting for each region of the touch panel 4 (see FIGS. 1A and 1B) will be described below with reference to FIGS. 5 to 14.

Figure 5:
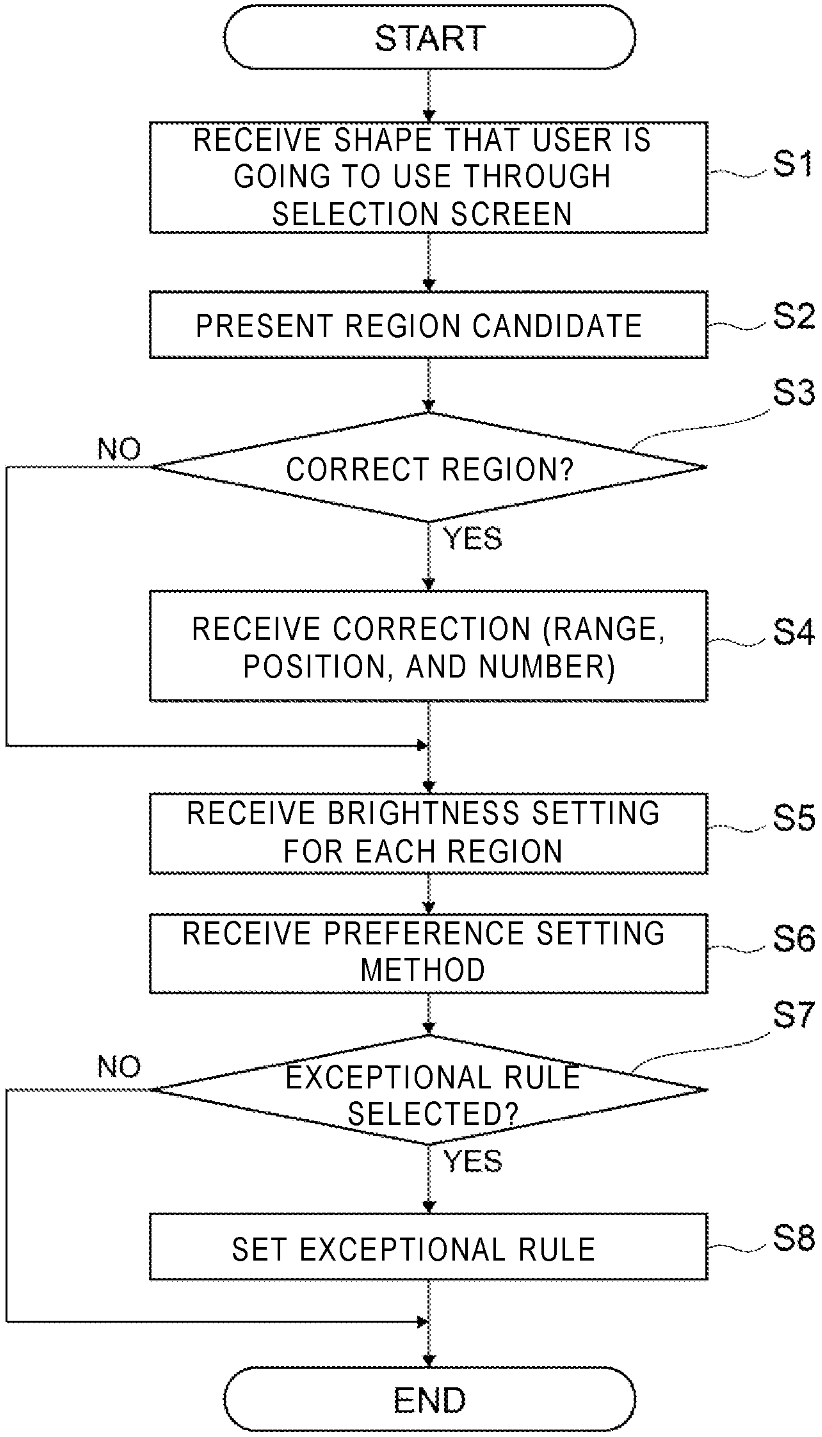
FIG. 5 is a flowchart illustrating a process of setting brightness for each region on one deformable display surface.

FIG. 5 is a flowchart illustrating a process of setting brightness for each region on one deformable display surface. A symbol "S" illustrated in FIG. 5 refers to a "step".

The CPU 101 implements the process illustrated in FIG. 5 by executing the program. First, the CPU 101 receives a shape that the user is going to use, through a selection screen (step 1).

Figure 6:
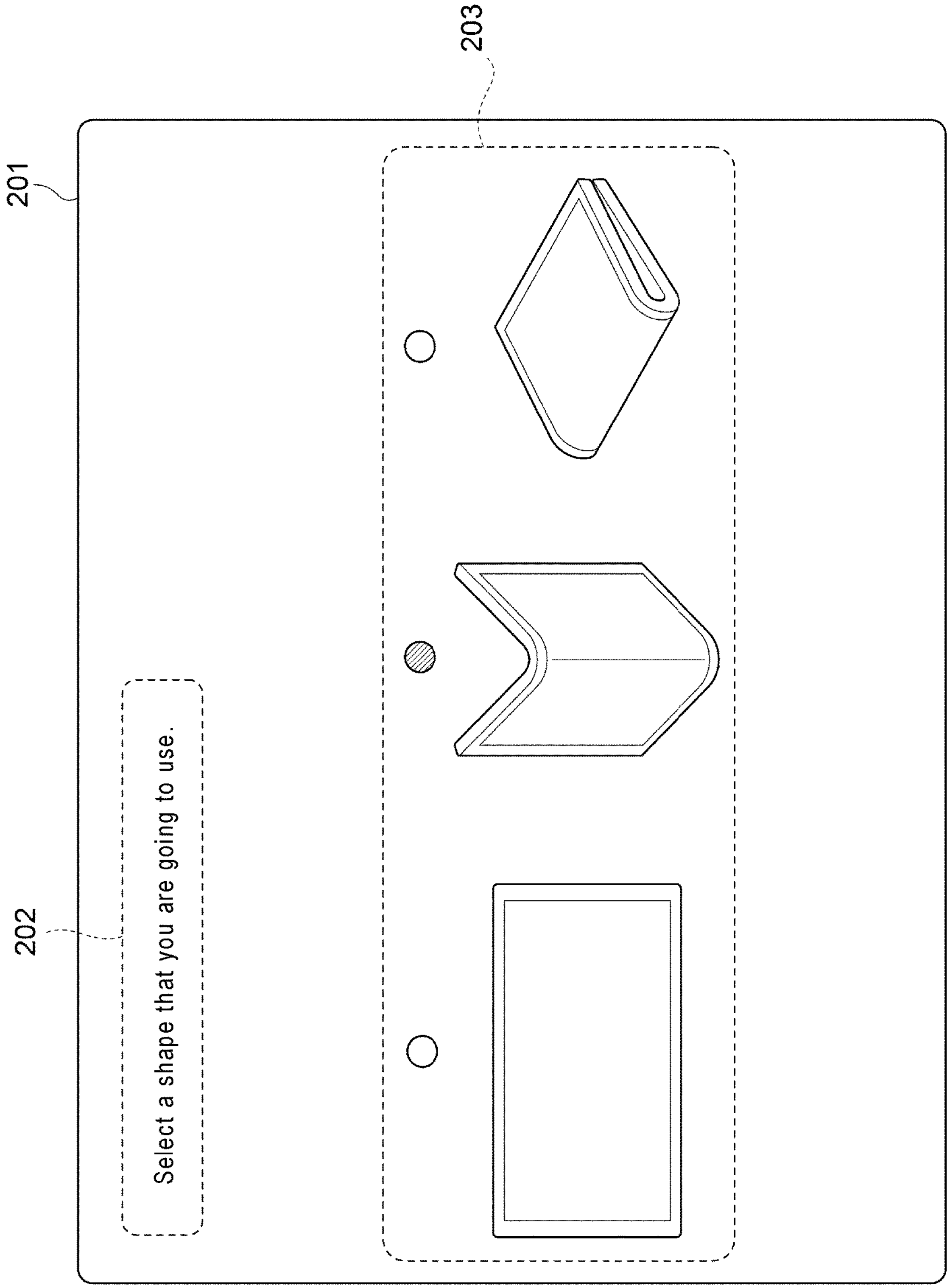
FIG. 6 is a diagram illustrating an example of a screen that receives a shape that the user is going to use.

FIG. 6 is a diagram illustrating an example of a screen 201 that receives the shape that the user is going to use. The screen 201 in FIG. 6 illustrates a sentence 202 describing an operation that the user is requested to conduct and candidates 203 of the shape that the user is going to use.

In the case of FIG. 6, the sentence 202 is "Select a shape that you are going to use". The candidates 203 illustrate three representative shapes. A shape at a left end is a shape in which the display surface is in a flat state. A shape at a middle is a shape in which the display surface is bent into an L shape. A shape at a right end is a shape in which the display surface is folded. In the case of FIG. 6, a radio button on the middle candidate 203 is selected.

The description returns to FIG. 5. When receiving the selection of the shape in step 1, the CPU 101 presents region candidates in accordance with the selected shape (step 2).

Figure 7:
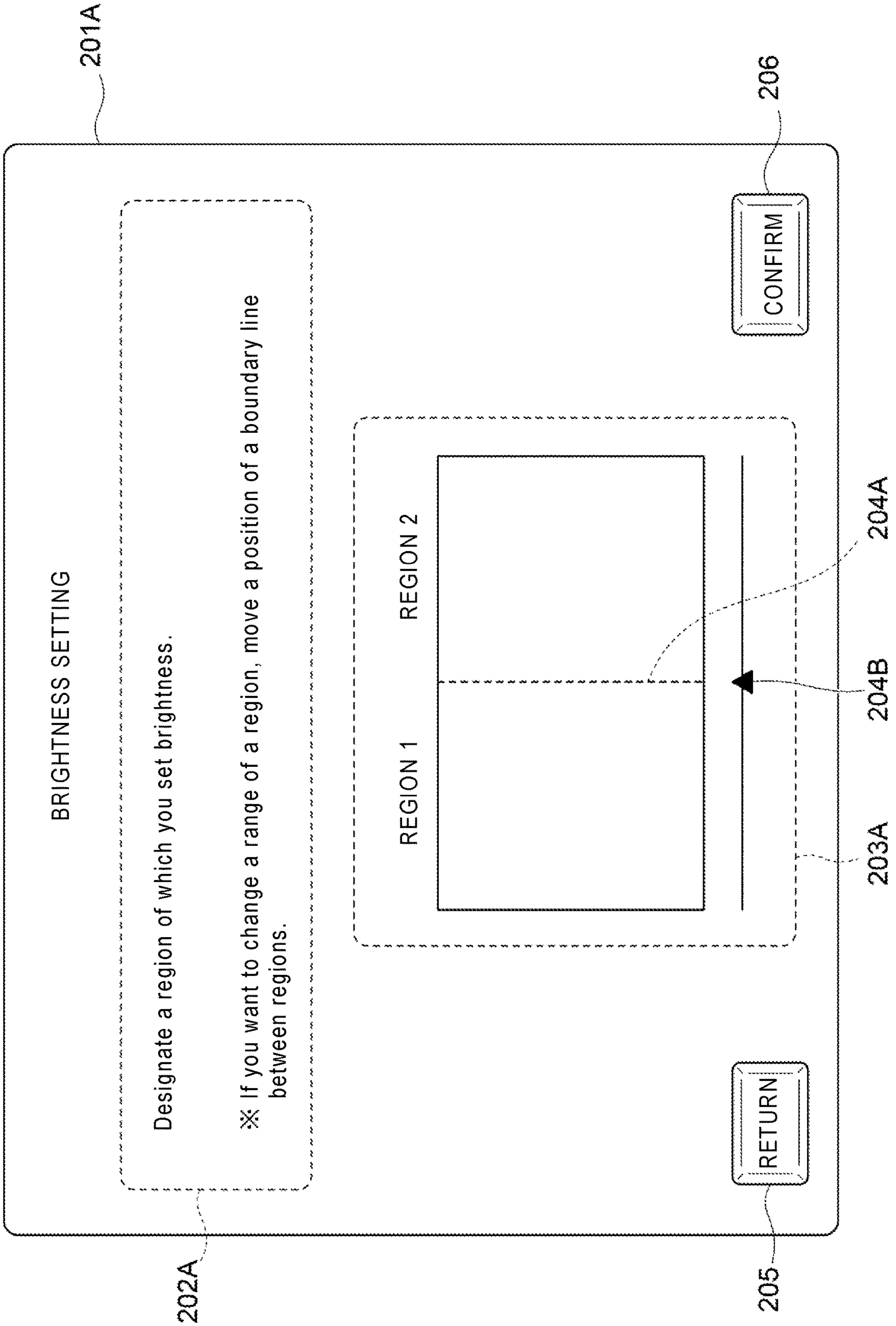
FIG. 7 is a diagram illustrating an example of brightness setting screen displayed on a touch panel.

FIG. 7 is a diagram illustrating an example of a brightness setting screen 201A displayed on the touch panel 4. The screen 201A illustrates a sentence 202A describing an operation that the user is requested to conduct, a region candidates 203A prepared for the selected shape, a button 205 for returning to the shape selection, and a button 206 for confirming the setting.

In the case of FIG. 7, the sentence 202A includes two sentences. One is "Designate a region of which you set brightness", and the other is "If you want to change a range of a region, move a position of a boundary line between regions".

The region candidate illustrated in FIG. 7 is, for example, one in a case where the touch panel 4 is bent into an L shape and used or a case where the touch panel 4 is folded and used. In the example of FIG. 7, a "REGION 1" and a "REGION 2" that have a boundary at a position of the hinge 3 (see FIGS. 1A and 1B) are presented as candidates.

The "REGION 1" and the "REGION 2" have the same area at a time point when they are presented as the candidates. In other words, the display surface is bisected into the "REGION 1" and the "REGION 2" at the midpoint of the long side of the display surface.

A boundary line 204A that gives the boundary between the "REGION 1" and the "REGION 2" and a slider 204B used for moving a position of the boundary line 204A are disposed in the candidate 203A.

In the case of FIG. 7, when the slider 204B is moved right and left, the boundary line 204A is also moved right and left. For example, when the slider 204B is moved leftward, the area of the "REGION 1" decreases while the area of the "REGION 2" increases. On the contrary, when the slider 204B is moved rightward, the area of the "REGION 1" increases while the area of the "REGION 2" decreases.

Figure 8:
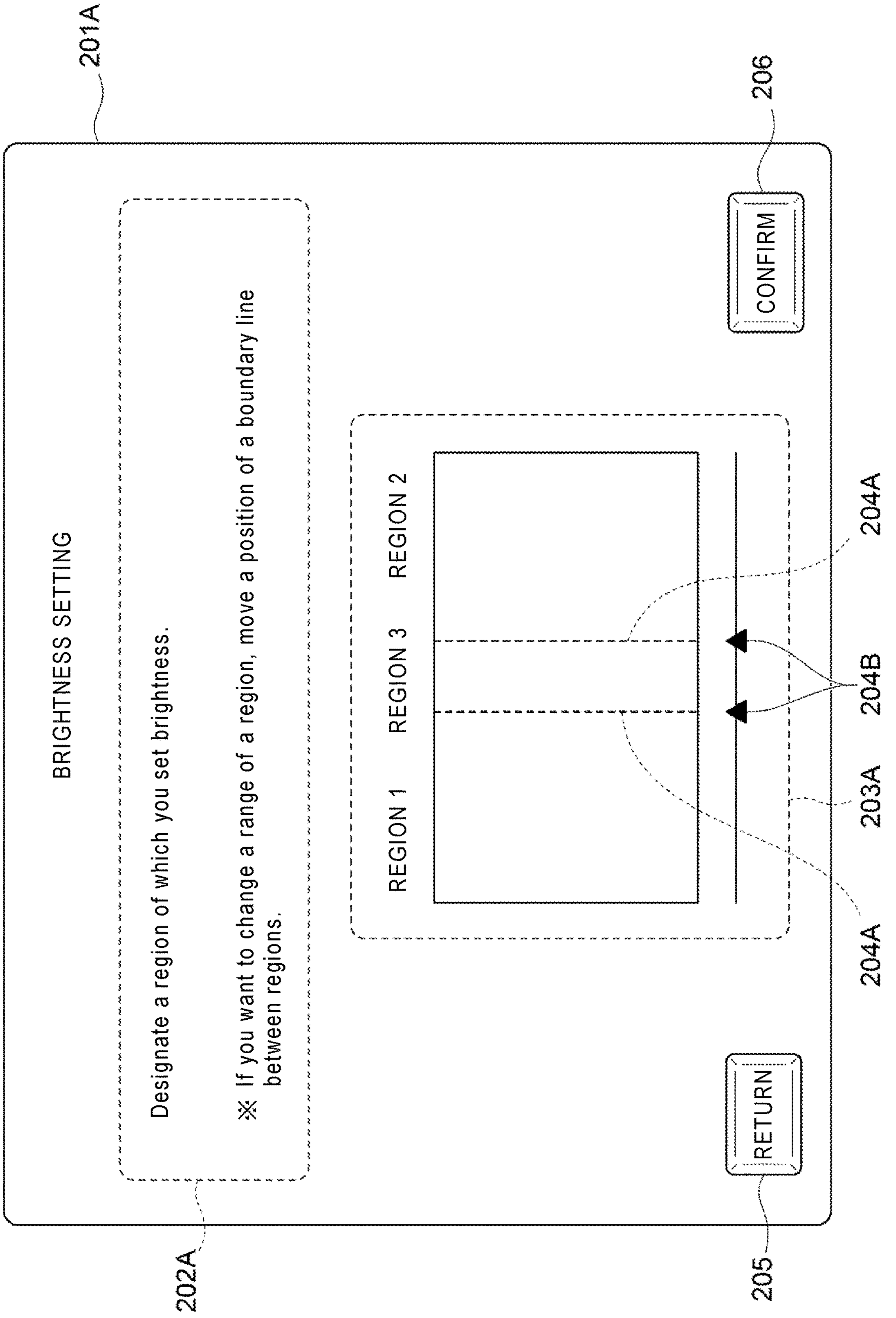
FIG. 8 is a diagram illustrating another example of the brightness setting screen displayed on the touch panel.

FIG. 8 is a diagram illustrating another example of the brightness setting screen 201A displayed on the touch panel 4. In FIG. 8, corresponding reference numerals are allocated to elements that correspond to the elements illustrated in FIG. 7.

A region candidate illustrated in FIG. 8 is, for example, one in the case where the touch panel 4 is bent into an L shape and used or the case where the touch panel 4 is folded and used. In the example of FIG. 8, a region around the hinge 3 (see FIGS. 1A and 1B) where the display surface is curved is presented as an independent "REGION 3".

The screen 201A illustrated in FIG. 8 is used when the user desires to individually set brightness of the region where the display surface is curved. Which of (i) the screen 201A illustrated in FIG. 7 and (ii) the screen 201A illustrated in FIG. 8 is to be displayed may be preset in the internal memory 107 (see FIG. 4). A setting for the screen used in the display here may be a setting on a program or a setting by the user. The screen 201A illustrated in FIG. 7 and the screen 201A illustrated in FIG. 8 may be switchable by operating a button (not illustrated).

The description returns to FIG. 5. After presenting the region candidate, the CPU 101 determines whether there is a correction for the region (step 3).

When an operation of moving the boundary line 204A by the user is detected, an affirmative result is obtained in the step 3. On the other hand, when the operation of moving the boundary line 204A by the user is not detected but an operation of the button 206 used for confirmation is detected, a negative result is obtained in the step 3. When an operation of the button 205 for returning to the selection of the shape is detected, the CPU 101 returns to the step 1. In FIG. 5, a determination that is made when the operation of the button 205 is detected is omitted.

When the affirmative result is obtained in step 3, the CPU 101 receives the correction (step 4). In the present exemplary embodiment, the CPU 101 receives corrections of ranges of regions, a position of a region, the number of the regions, and the like. In the present exemplary embodiment, receiving the correction of the ranges of the regions is receiving the movement of the position of the boundary line 204A described above.

Figure 9:
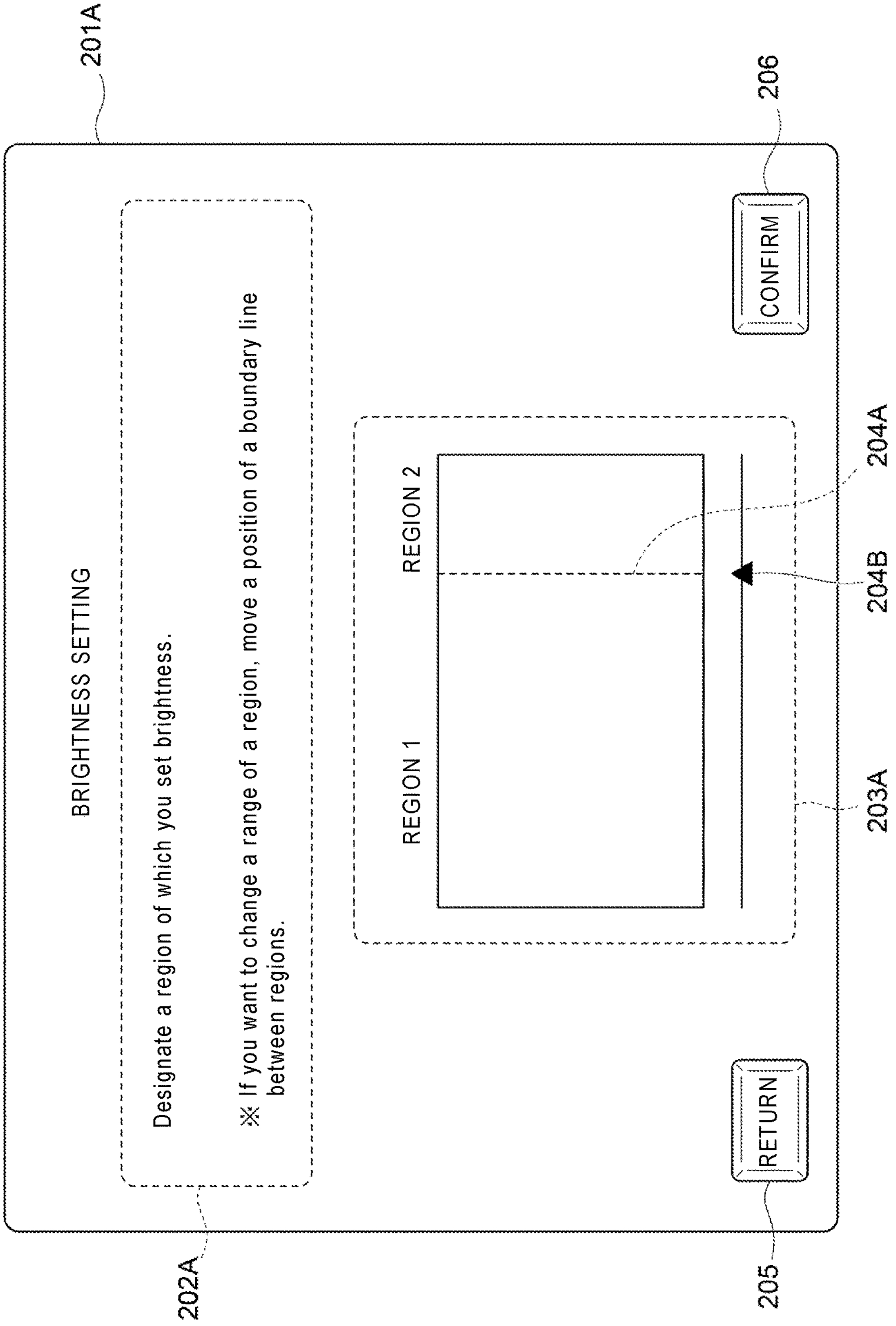
FIG. 9 is a diagram illustrating an example of correcting a range of a region whose brightness is to be set.

FIG. 9 is a diagram illustrating an example of correcting the ranges of the regions whose brightness is to be set. In FIG. 9, corresponding reference numerals are allocated to elements that correspond to the elements illustrated in FIG. 7.

In the case of FIG. 9, the slider 204B is moved rightward from the middle of the long side. Therefore, the area of the "REGION 1" increases while the area of the "REGION 2" decreases.

Figure 10:
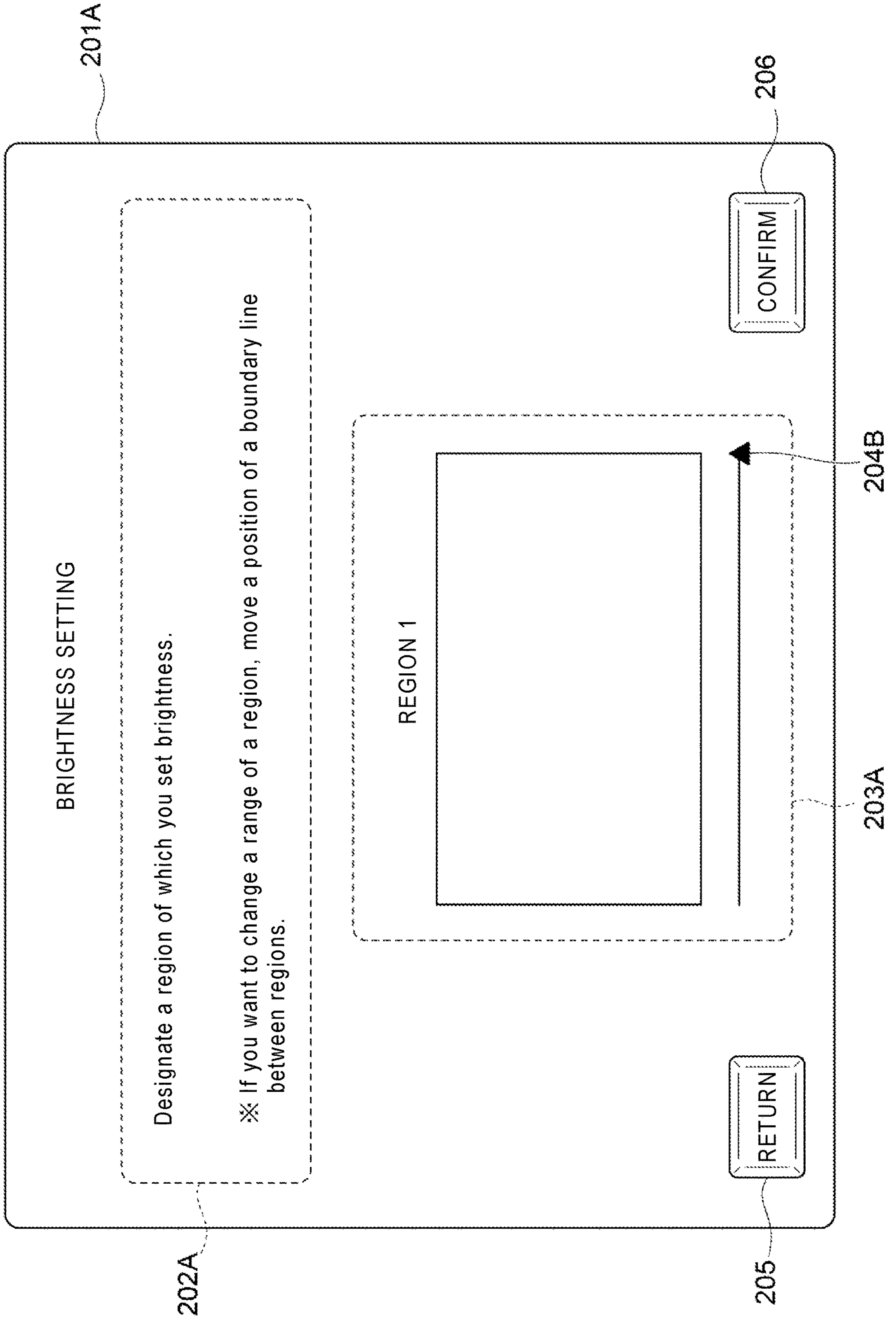
FIG. 10 is a diagram illustrating another example of correcting the range of the region whose brightness is to be set.

FIG. 10 is a diagram illustrating another example of correcting the ranges of the regions whose brightness is to be set. In FIG. 10, corresponding reference numerals are allocated to elements that correspond to the elements illustrated in FIG. 7.

In the case of FIG. 10, the slider 204B is moved to a right end of a region representing the display surface. Therefore, a single region is set on the display surface. The example illustrated in FIG. 10 also represents an example of correcting the number of the regions. In FIG. 10, the slider 204B is moved to the position of the right end of the region representing the display surface. The slider 204B may be moved to a position of a left end of the region representing the display surface.

When the slider 204B in the state illustrated in FIG. 10 is moved to a middle position of the long side, the "REGION 1" and the "REGION 2" are set on the display surface as illustrated in FIG. 7.

When the user selects on the shape selection screen 201 to use the information terminal 1 in the flat state (see FIG.

6), the screen 201A illustrated in FIG. 10 is presented from the beginning as a screen presenting the region candidate.

In the above description with reference to the screens 201A illustrated in FIGS. 9 and 10, the slider 204B is an operation target. Alternatively, the ranges of the "REGION 1" and the "REGION 2" may be corrected by dragging the boundary line 204A on the display surface.

Figure 11:
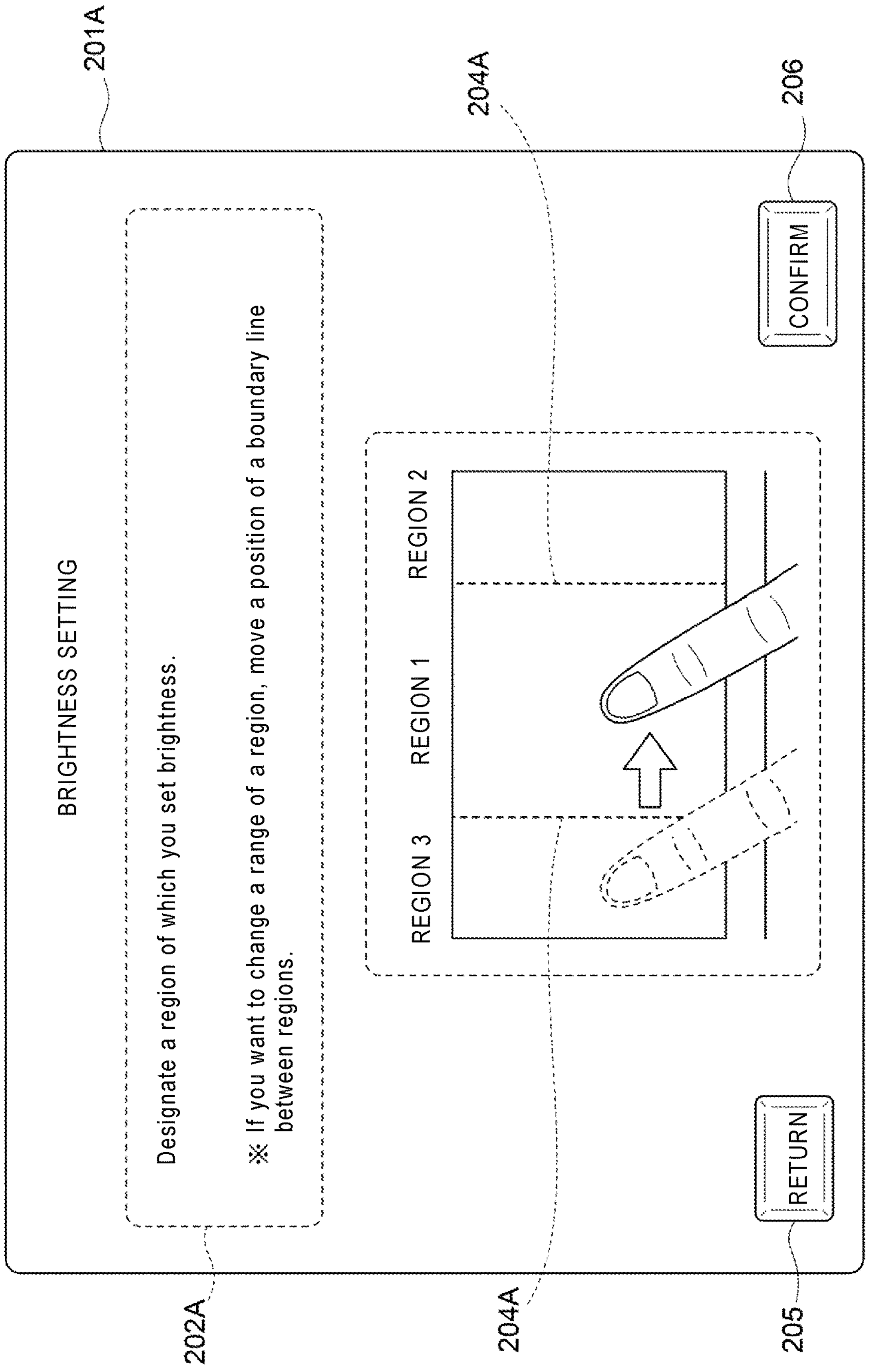
FIG. 11 is a diagram illustrating an example of correcting a position of the region.

FIG. 11 is a diagram illustrating an example of correcting the position of the region. In FIG. 11, corresponding reference numerals are allocated to elements that correspond to the elements illustrated in FIG. 7.

FIG. 11 illustrates an example in which one of the two regions is selected and dragged. In the example of FIG. 11, the "REGION 1" designated by the user is moved rightward. Therefore, the "REGION 3" appears on a left side of the "REGION 1". With an operation illustrated in FIG. 11, the position of the region and the number of the regions are simultaneously corrected.

The description returns to FIG. 5. When the negative result is obtained in step 3 or when the reception of the corrections in step 4 is confirmed, the CPU 101 receives the brightness setting for each region (step 5).

Figure 12:
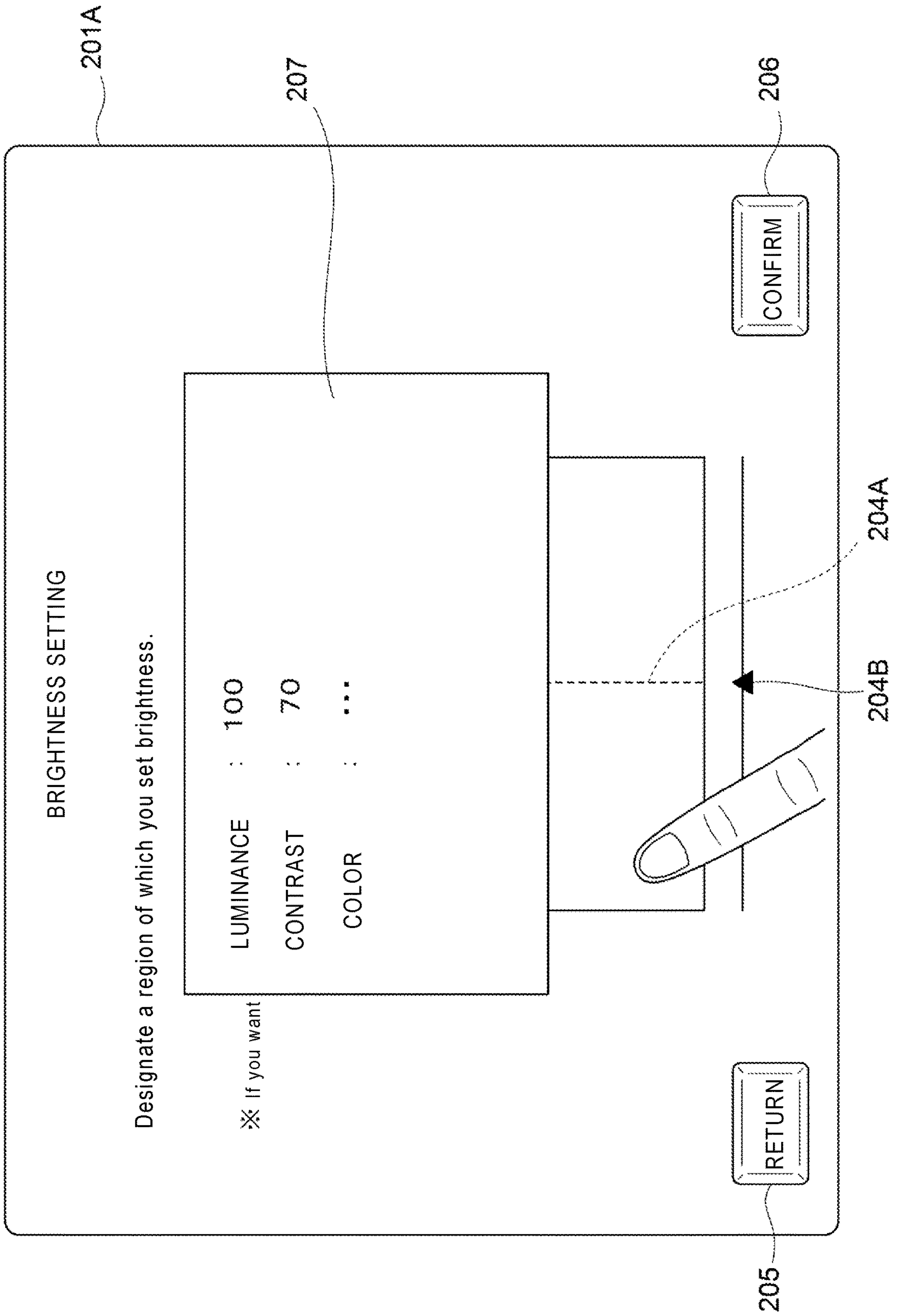
FIG. 12 is a diagram illustrating an example of the brightness setting screen.

FIG. 12 is a diagram illustrating an example of the brightness setting screen. In FIG. 12, corresponding reference numerals are allocated to elements that correspond to the elements illustrated in FIG. 7.

The screen 201A illustrated in FIG. 12 represents a state where a small screen 207 for setting brightness of the "REGION 1" located on the left side of the two regions constituting the display surface is displayed. In the case of FIG. 12, luminance, contrast, and a color may be set on the small screen 207.

In the case of FIG. 12, a luminance value may be set between "0" and "100". The luminance value gives a maximum value of the luminance used for displaying a corresponding region.

In the example of FIG. 12, since the luminance value is "100", the luminance of the "REGION 1" is set to the maximum value. When the luminance value is set to "0", the corresponding "REGION 1" is turned off. A contrast value may also be set between 0 and 100.

When a confirmation button (not illustrated) on the small screen 207 is operated, the CPU 101 returns to the screen 201A in FIG. 7. The small screen 207 may be provided with a button for closing the small screen 207.

Figure 13:
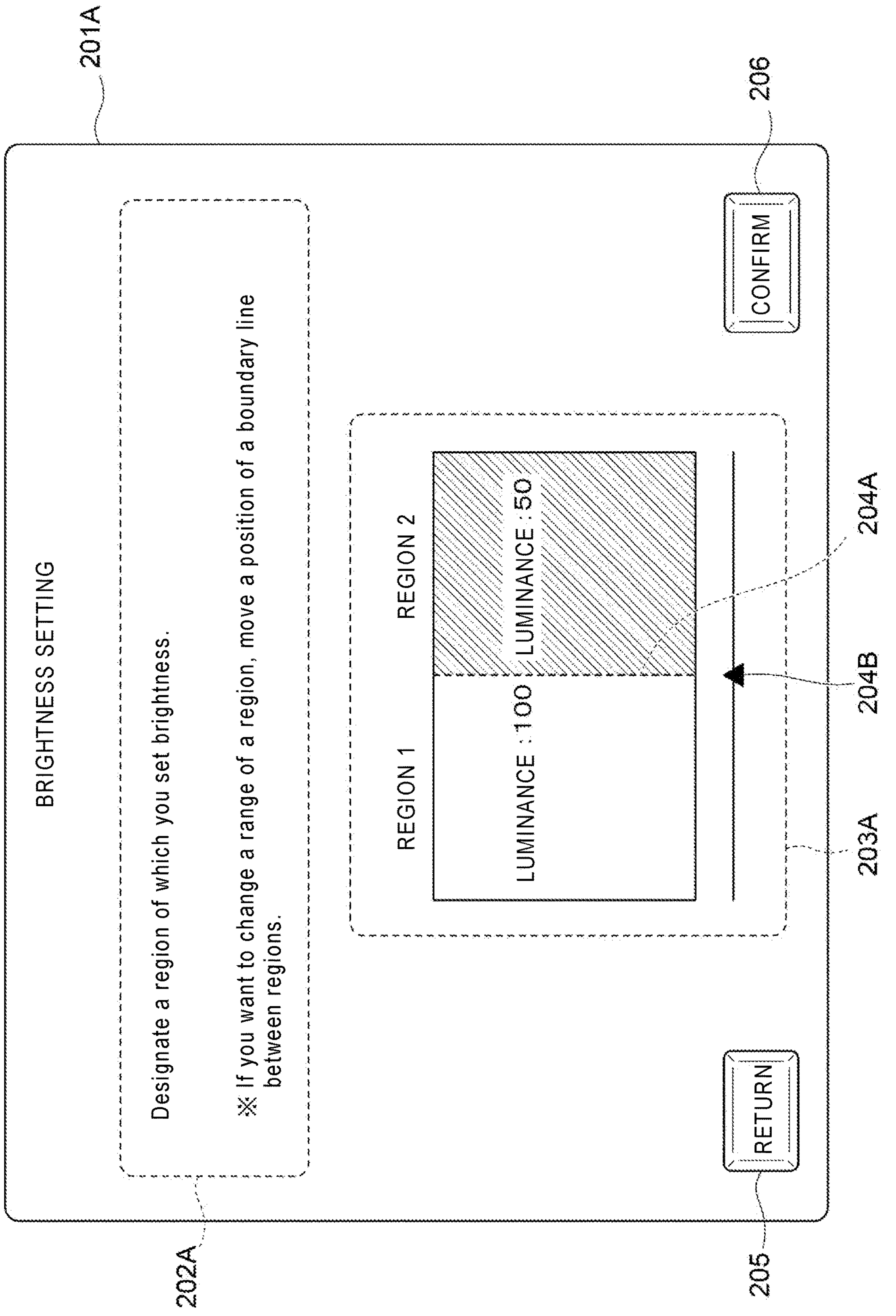
FIG. 13 is a diagram illustrating a display example of the screen after the information terminal receives the brightness setting made by a user for each region.

FIG. 13 is a diagram illustrating a display example of the screen 201A after the information terminal 1 receives the brightness setting made by the user for each region. In FIG. 13, corresponding reference numerals are allocated to elements that correspond to the elements illustrated in FIG. 7.

The screen 201A illustrated in FIG. 13 represents a state where the luminance value of the "REGION 1" located on the left side of the drawing is set to "100", and a luminance value of the "REGION 2" located on the right side of the drawing is set to "50".

In the present exemplary embodiment, the brightness of each region illustrated in the region candidate 203A on the screen 201A reflects the luminance value set by the user. This display facilitates the user to recognize the brightness of each region.

In the present exemplary embodiment, a case where the luminance value is "51" to "100" is expressed as "bright", and a case where the luminance value is "0" to "50" is expressed as "dark".

The luminance value is an example. A case where a luminance value higher than a predetermined reference value is used may be expressed as "bright", and a case where a luminance value lower than the predetermined reference value is used may be expressed as "dark".

Both a luminance value expressed as "bright" and a luminance value expressed as "dark" may be specific values determined in advance. For example, the luminance value expressed as "bright" may be "75", and the luminance value expressed as "dark" may be "25".

The description returns to FIG. 5. When the brightness setting in step 5 is completed, the CPU 101 receives a setting method to which a preference is given (step 6).

Figure 14:
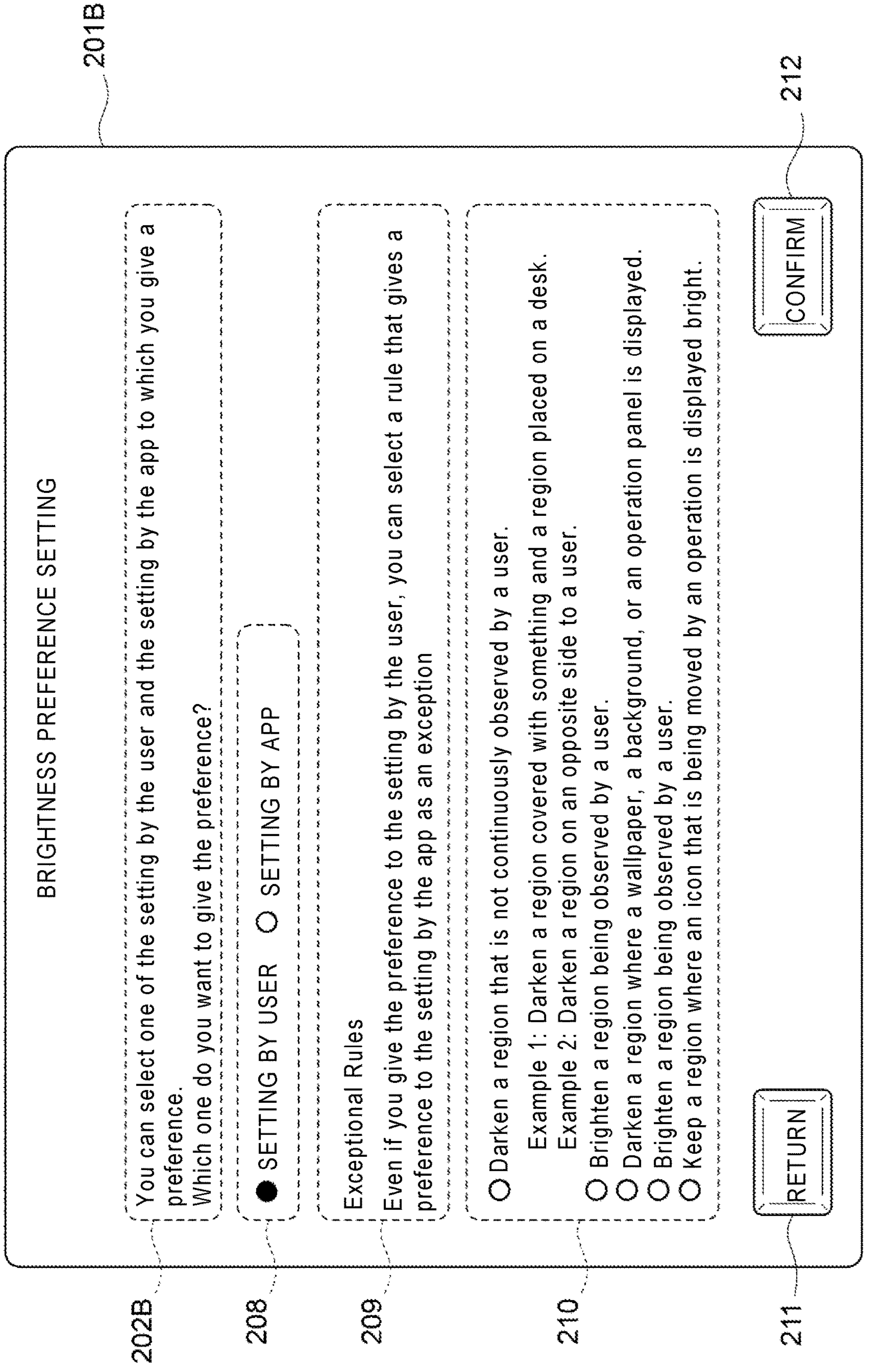
FIG. 14 is a diagram illustrating an example of a screen for making a brightness preference setting.

FIG. 14 is a diagram illustrating an example of a screen 201B for making a brightness preference setting.

The screen 201B illustrates a sentence 202B describing an operation that the user is requested to conduct, a selection target 208, a sentence 209 requesting selection of exceptional rules, an exceptional rule selection field 210, a button 211 for returning to the previous screen 201, and a button 212 for confirming the setting.

In the case of FIG. 14, the sentence 202B includes two sentences. One is "You can select one of the setting by the user and the setting by the app to which you give a preference", and the other is "Which one do you want to give the preference?".

In the present exemplary embodiment, the brightness set by the user for each region or the brightness set by the app for each region may be selected.

When the brightness set by the user for each region is selected, the brightness according to the setting received in the step 5 (see FIG. 5) is used for the display.

When the brightness set by the app for each region is selected, the brightness that is determined in accordance with content and a type of an image output by the app is used for the display. For example, when the content of the image is a video, a document, or the like, a luminance value of a region where this image is displayed is set to, for example, "100".

The video, the document, or the like is an example of images that are premised on that the user continuously observe. In other words, the video, the document, or the like is an image in which an arrangement of elements constituting the image changes in accordance with a user's operation or the like. A region where the video, the document, or the like is displayed is an example of a region where information is displayed.

When the content of the image is a panel (hereinafter referred to as an "operation panel") used for operating a keyboard or the like, the luminance value of the region where this image is displayed is set to, for example, "50". A luminance value of a region where a wallpaper or a background is displayed is also set to, for example, "50". The operation panel is an example of an image whose displayed content does not change with time. In other words, the operation panel is an image in which the arrangement of the elements constituting the image is fixed. Examples of the wallpaper and the background also include a case where an image with scattered petals is superimposed on a still image.

In FIG. 14, a radio button corresponding to the "setting by the user" is selected from the selection target 208. In a case of this selection, as a general rule, an image of each region is displayed with the brightness set by the user.

On the other hand, it may not be desirable to always use the brightness setting by the user. Therefore, in the present exemplary embodiment, the exceptional rules are prepared.

The sentence 209 describes "Exceptional rule: Even if you give the preference to the setting by the user, you can select a rule that gives a preference to the setting by the app as an exception". The sentence 209 describes that plural rules are selectable.

In the case of FIG. 14, five rules are exemplified in the selection field 210.

One of the rules is a rule for darkening a region that is not continuously observed by the user. As an example of this rule, a case where a region covered with something and a region placed on a desk are darkened, and a case where a region on an opposite side to the user is darkened are exemplified in the screen 201B. When this rule is valid, even if the setting by the user is "bright", the display is forcibly controlled to be dark.

One of the rules is a rule for brightening a region being observed by the user. This rule is a rule for, even when the setting by the user is "dark", forcibly brightening the region being observed by the user.

Examples of the region being observed by the user include the region for displaying the video or the document described above, and an operator such as a cursor used by the user. For example, even when the display region assigned to the app extends beyond a range of the region set by the user, the user easily observe the display region. In other words, this rule means that the luminance value is changed to a value higher than the luminance value set by the user. For example, when the luminance value set by the user is "75", the luminance value is changed into "90".

One of the rules is a rule for darkening the region where the wallpaper, the background, or the operation panel is displayed. One of the rules is a rule for forcibly darkening brightness of a region having a relatively low degree of importance among the regions that the user can observe. For example, when there is the region where the wallpaper or the background is displayed around the region where the video or the document is displayed, a setting for the region corresponding to the wallpaper or the background is forcibly controlled to be dark even when the setting is "bright".

One of the rules is a rule for brightening the region where the information is displayed. This rule is a rule for changing a luminance value to a high value so that the user can more easily observe the region having a relatively high degree of importance.

One of the rules is a rule for keeping a region where an icon that is being moved by an operation is displayed bright. This rule is a rule for, when the moving icon moves beyond a region whose setting is bright to a dark region, maintaining the brightness used for the display instead of darkening display of the icon.

In the case of the screen 201B illustrated in FIG. 14, no radio button of any rule is selected. Therefore, when the button 212 on the screen 201B illustrated in FIG. 14 is operated, the CPU 101 does not use any exceptional rule. That is, the CPU 101 controls the display of each region according to the brightness set by the user.

In the present exemplary embodiment, a region that is not continuously observed by the user or the region being observed by the user is specified based on, for example, (i) image data output by the camera module 102 (see FIG. 4), (ii) information on the shape of the information terminal 1 (see FIGS. 1A and 1B), and (iii) detection signals output by the infrared sensors 106 (see FIG. 4).

When the intensity of the infrared rays detected by the infrared sensor 106 is equal to or greater than the threshold, for example, it is possible to determine that a surface or the region where the corresponding infrared sensor 106 is provided is covered with another object or is placed on a surface such as a desk. These regions are determined as the regions that are not continuously observed by the user. In order to determine other regions as the region being observed by the user, it is necessary to analyze the information on the shape of the information terminal 1 and the image data output by the camera module 102. The camera module 102 here is an example of a detector.

The information on the shape of the information terminal 1 uses either one or both of (i) the shape received in the step 1 among the shapes (see FIG. 6) into which the information terminal 1 can be physically deformed and (ii) the bending angle output by the hinge angle sensor 103 (see FIG. 4).

For example, in a case where the information terminal 1 is used in the flat plate shape, when the image data output by the camera module 102 includes an image of a face or eyes that have a size equal to or greater than a predetermined size, the CPU 101 determines that the entire touch panel 4 (see FIGS. 1A and 1B) is observed by the user.

The image of eyes that have a size equal to or greater than the predetermined size is used to exclude an image of a face or eyes of a person appearing around or behind the user who uses the information terminal 1, from targets to be determined. The predetermined size is preset, for example, in the app.

In a case where the camera module 102 is provided on only one of short sides, when the information terminal 1 is bent and used or is folded and used, the CPU 101 determines whether the image data output by the camera module 102 includes the image of eyes that have a size equal to or greater than the predetermined size.

When the image data includes the image of eyes that have the size equal to or greater than the predetermined size, a surface on which the camera module 102 is provided or a region around the camera module 102 is determined to be the region that can be observed by the user.

The entire display surface of the touch panel 4 may be determined as the region that can be observed by the user depending on (i) a position where the image of eyes is detected in the image data and (ii) the bending angle. For example, this corresponds to a case where the CPU 101 determines that the user is observing from the ridge side of the information terminal 1 when the information terminal 1 is bent at approximately 90°.

In order to determine whether the user is actually looking at the display surface, it is necessary to specify a relationship between (i) the direction of the line of sight of the user and (ii) the shape of the display surface, by analyzing the image data.

When the image data includes the image of eyes that have the size equal to or greater than the predetermined size, a region that is bent toward an opposite side to the side on which the camera module 102 is provided is determined as the region that is not continuously observed by the user.

The description returns to FIG. 5. When the button 212 for confirming the setting is operated on the screen 201B, the CPU 101 determines whether the exceptional rule is selected (step 7).

When an affirmative result is obtained in step 7, the CPU 101 sets the exceptional rule based on the selection in the selection field 210 on the screen 201B (step 8).

On the other hand, when a negative result is obtained in step 7, the CPU 101 ends the process of setting the brightness for each region without setting the exceptional rule.

Examples of Controlling Brightness

Hereinafter, a relationship between the brightness set by the user for each region and control of the brightness of each region in accordance with the shape of the information terminal 1 will be described with reference to FIGS. 15 to 19.

Figure 15A:
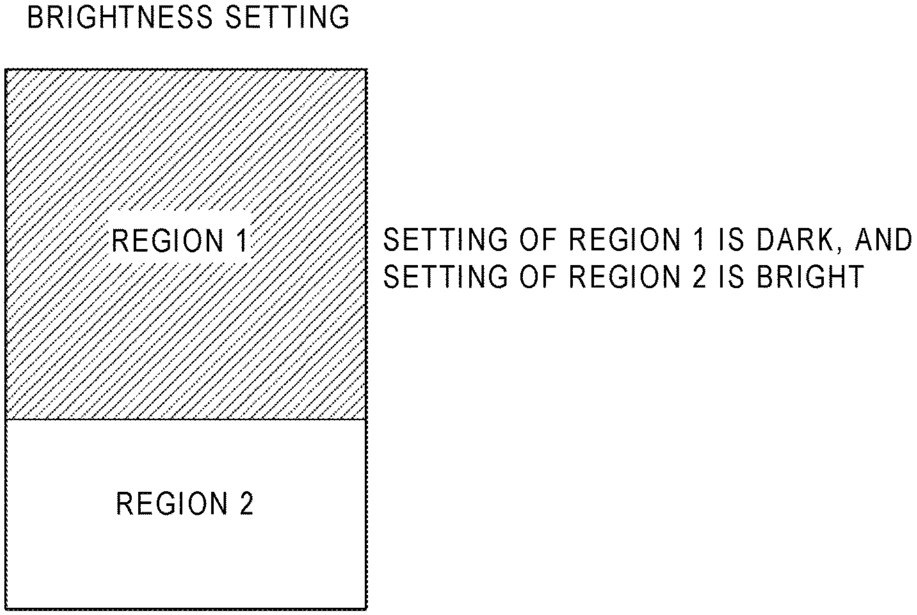
FIGS. 15A and 15B are diagrams illustrating an example of controlling the brightness of each region when a ridge side of the information terminal bent at approximately 90° faces upward.
Figure 15B:
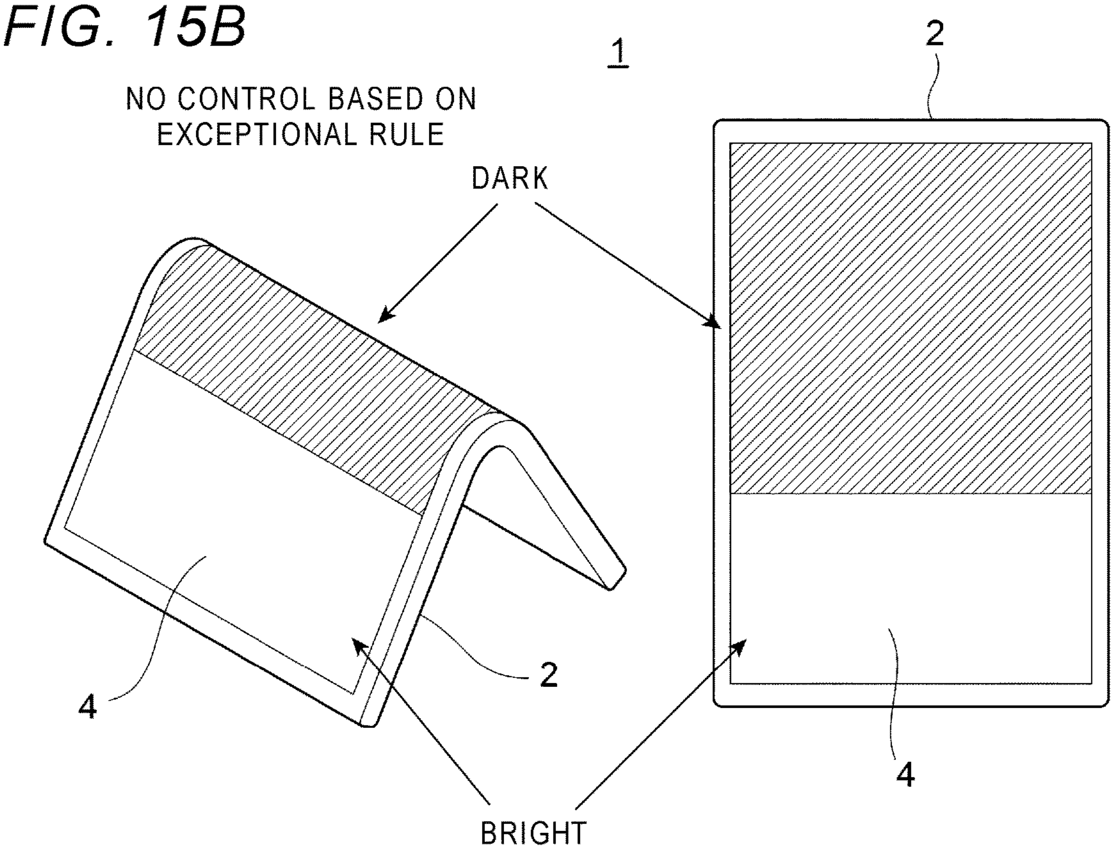

FIGS. 15A and 15B are diagrams illustrating an example of controlling the brightness of each region when the ridge side of the information terminal 1 bent at approximately 90° faces upward. FIG. 15A illustrates an example of a setting made by the user for each region. FIG. 15B illustrates an example of controlling the brightness of each region of the touch panel 4 during use.

In the example of FIGS. 15A and 15B, as to the regions constituting the display surface of the touch panel 4, the brightness of the "REGION 1" is set to be dark, and the brightness of the "REGION 2" is set to be bright. It is noted that the "REGION 1" is corrected to have an area that is approximately two thirds of the display surface, and that the "REGION 2" is corrected to have an area that is approximately one third of the display surface. The example illustrated in FIGS. 15A and 15B is a case where no exceptional rule is set.

Therefore, when the information terminal 1 is bent at approximately 90° at a position of the hinge 3 (see FIGS. 1A and 1B), a part of a region on the ridge side is displayed dark. A method of always determining the brightness of the display regions to be different on either side of the bending position cannot achieve the above described brightness setting.

Figure 16A:
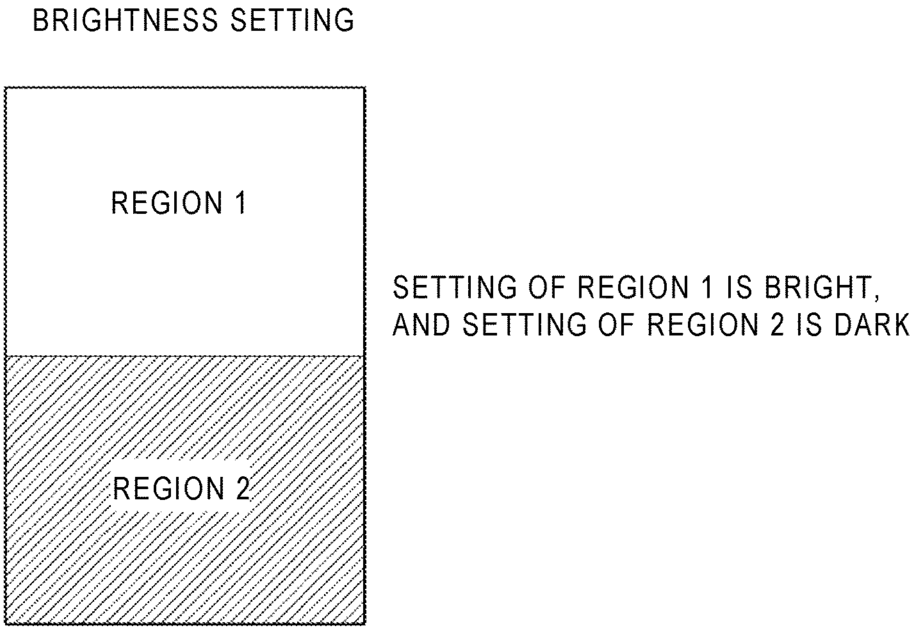
FIGS. 16A and 16B are diagrams illustrating an example of controlling the brightness of each region when the information terminal is used in a flat state.
Figure 16B:
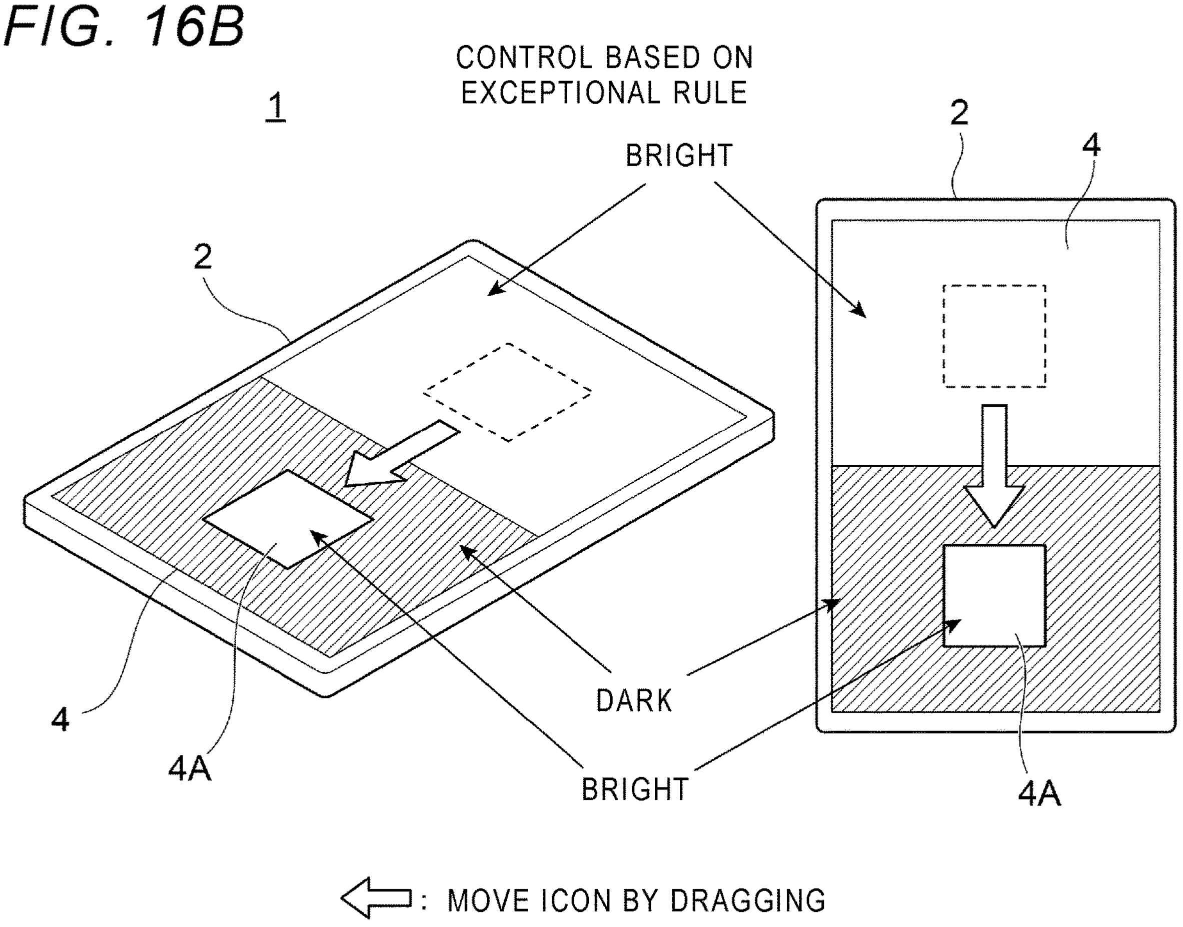

FIGS. 16A and 16B are diagrams illustrating an example of controlling the brightness of each region when the information terminal 1 is used in a flat state. FIG. 16A illustrates an example of a setting made by the user for each region. FIG. 16B illustrates an example of controlling the brightness of each region of the touch panel 4 during use.

In the example illustrated in FIGS. 16A and 16B, as to the regions constituting the display surface of the touch panel 4, the setting for the "REGION 1" is bright and the setting for the "REGION 2" is dark. The example of FIGS. 16A and 16B illustrates a case where the user moves an icon 4A displayed in the "REGION 1" to the "REGION 2".

In the example illustrated in FIGS. 16A and 16B, the exceptional rule for keeping the brightness of the region where the moving icon is displayed is valid. Therefore, the icon 4A is displayed in a bright state even in the "REGION 2" having the dark setting. When this exceptional rule is invalid, the brightness of the moving icon 4A is changed to a dark state as the icon 4A overlaps the "REGION 2".

Figure 17A:
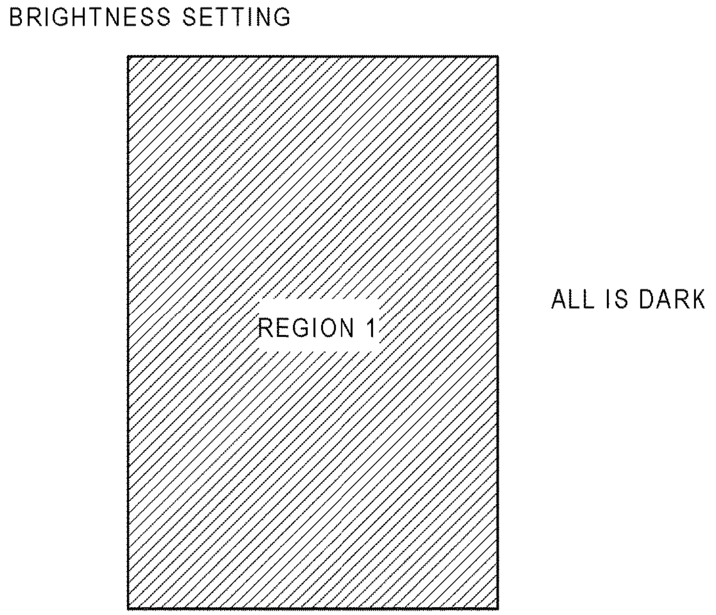
FIGS. 17A and 17B are diagrams illustrating another example of controlling the brightness of each region when the ridge side of the information terminal bent at approximately 90° faces upward.
Figure 17B:
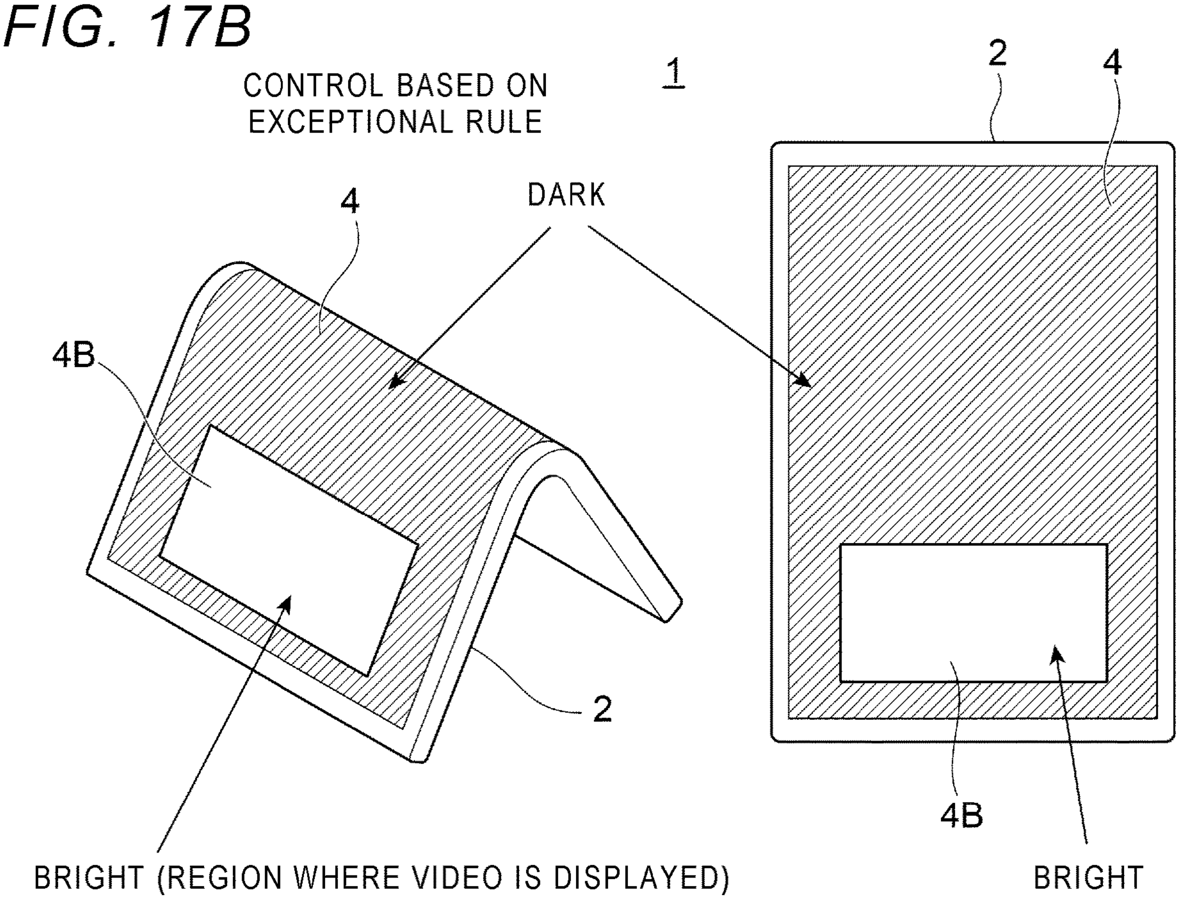

FIGS. 17A and 17B are diagrams illustrating another example of controlling the brightness of each region when the ridge side of the information terminal 1 bent at approximately 90° faces upward. FIG. 17A illustrates an example of a setting made by the user for each region. FIG. 17B illustrates an example of controlling the brightness of each region of the touch panel 4 during use.

In the example illustrated in FIGS. 17A and 17B, the entire display surface of the touch panel 4 is set dark. In the example of FIGS. 17A and 17B, due to the exceptional rule, only a region 4B where the video is displayed is displayed brightly. When the video displayed on the region 4B is closed on the display surface, the entire display of the touch panel 4 is brought into a dark state as set by the user.

Figure 18A:
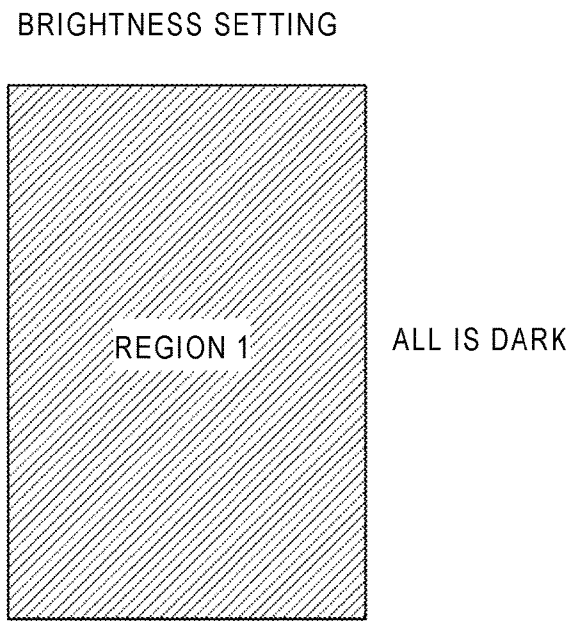
FIGS. 18A and 18B are diagrams illustrating further another example of controlling the brightness of each region when the ridge side of the information terminal bent at approximately 90° faces upward.
Figure 18B:
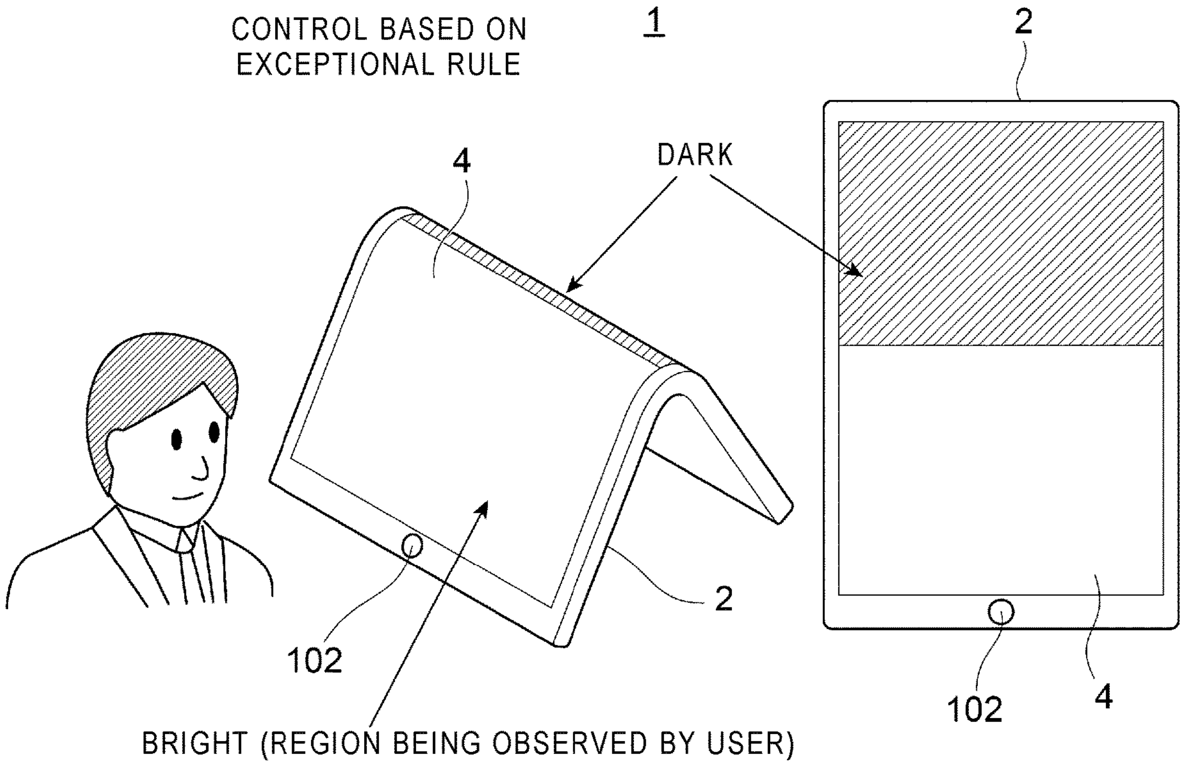

FIGS. 18A and 18B are diagrams illustrating another example of controlling the brightness of each region when the ridge side of the information terminal 1 bent at approximately 90° faces upward. FIG. 18A illustrates an example of a setting made by the user for each region. FIG. 18B illustrates an example of controlling the brightness of each region of the touch panel 4 during use.

In the example illustrated in FIGS. 18A and 18B, the entire display surface of the touch panel 4 is set dark. In the example of FIGS. 18A and 18B, due to the exceptional rule, the region being observed by the user is displayed brightly. In FIGS. 18A and 18B, the image data output by the camera module 102 (see FIG. 4) includes the image of a face or eyes of the user that have a size equal to or greater than the predetermined size. The information terminal 1 illustrated in FIGS. 18A and 18B is used in the state of being bent at approximately 90°. Therefore, only a region on a side where the camera module 102 is provided is controlled to be bright with the hinge 3 (see FIGS. 1A and 1B) as a boundary.

Figure 19A:
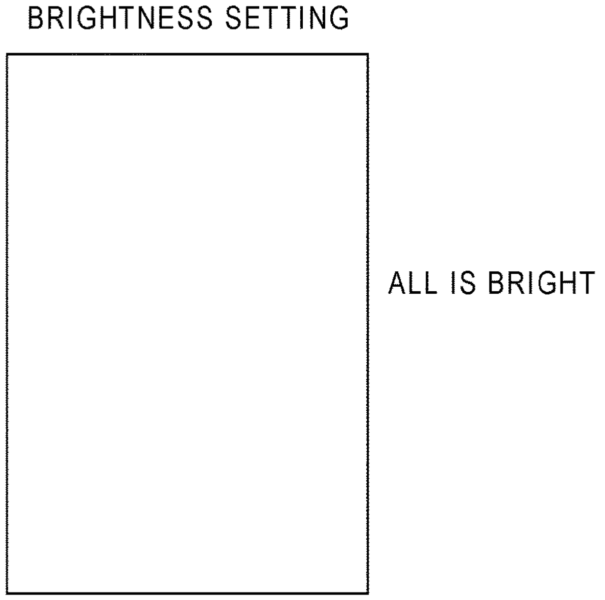
FIGS. 19A and 19B are diagrams illustrating an example of controlling the brightness of each region when one surface of the approximately folded information terminal is placed on a surface such as a desk and is used.
Figure 19B:
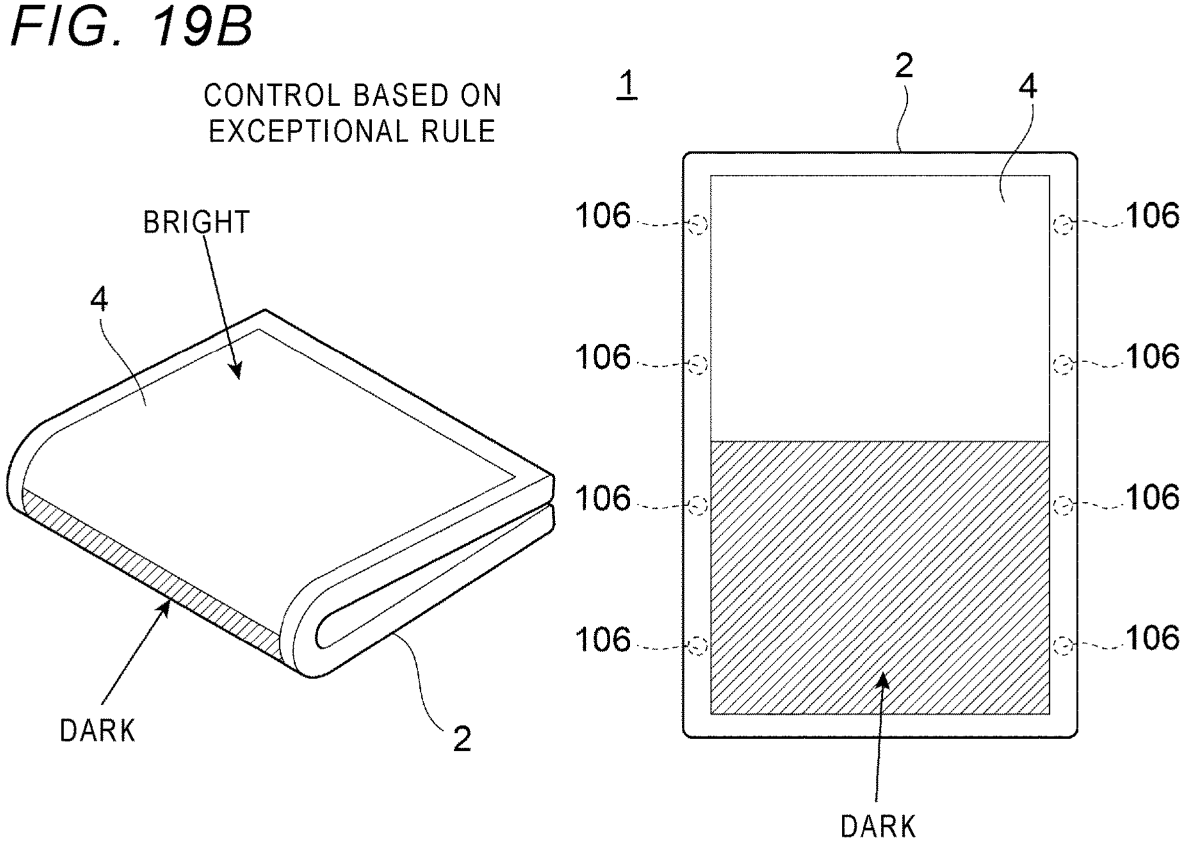

FIGS. 19A and 19B are diagrams illustrating an example of controlling the brightness of each region when one surface of the approximately folded information terminal 1 is placed on a surface such as a desk and is used. FIG. 19A illustrates an example of a setting made by the user for each region. FIG. 19B illustrates an example of controlling the brightness of each region of the touch panel 4 during use.

In the case of FIGS. 19A and 19B, the entire display surface of the touch panel 4 is set bright. However, in FIGS. 19A and 19B, the information terminal 1 is folded and one surface of the information terminal 1 is placed on the surface such as a desk. The folding of the information terminal 1 can be detected based on the information on the angle output by the hinge angle sensor 103 (see FIG. 4).

When it is found that the information terminal 1 is folded, the brightness of the display surface of the touch panel 4 is managed based on two regions into which the hinge 3 (see FIGS. 1A and 1B) divided the display surface. In the case of FIGS. 19A and 19B, four infrared sensors 106 are arranged along each of the long sides around the touch panel 4, eight in total. Among the eight infrared sensors 106, four infrared sensors 106 that face the surface on which the information terminal 1 is placed detect the infrared rays having an intensity equal to or greater than a threshold.

In the case of FIGS. 19A and 19B, the exceptional rule for darkening the region that is not continuously observed by the user is valid. Therefore, the region corresponding to the infrared sensors 106 that detect the infrared rays is controlled to be dark.

Second Exemplary Embodiment

FIGS. 20A and 20B are diagrams illustrating an example of an external configuration of an information terminal 1A used in a second exemplary embodiment. FIG. 20A is a front view of the information terminal 1A. FIG. 20B is a side view of the information terminal 1A. In FIGS. 20A and 20B, corresponding reference numerals are allocated to elements that correspond to the elements illustrated in FIGS. 1A and 1B. The information terminal 1A is an example of the information processing device.

Members constituting the information terminal 1A illustrated in FIGS. 20A and 20B are basically the same as those in the first exemplary embodiment. A difference is that a direction in which the information terminal 1A according to the present exemplary embodiment is bent is a side where the touch panel 4 is formed. In other words, a range in which a hinge 3A used in the present exemplary embodiment can rotate is opposite to a range in which the hinge 3 (see FIGS. 1A and 1B) used in the first exemplary embodiment can rotate.

Figure 21A:
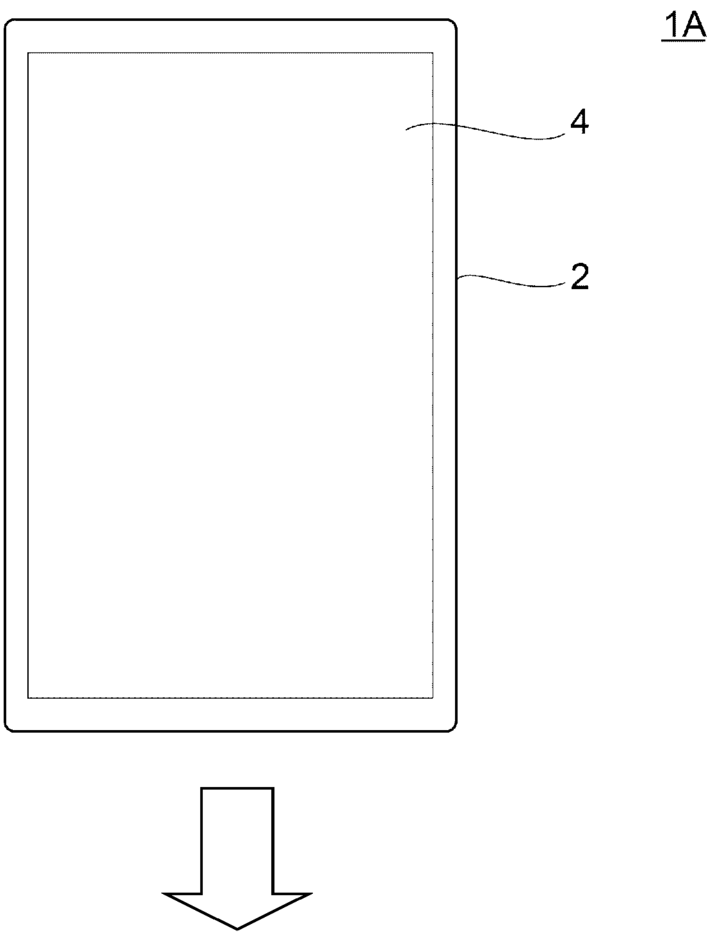
FIGS. 21A and 21B are diagrams illustrating an example of a change in a shape of the information terminal according to the second exemplary embodiment.
Figure 21B:
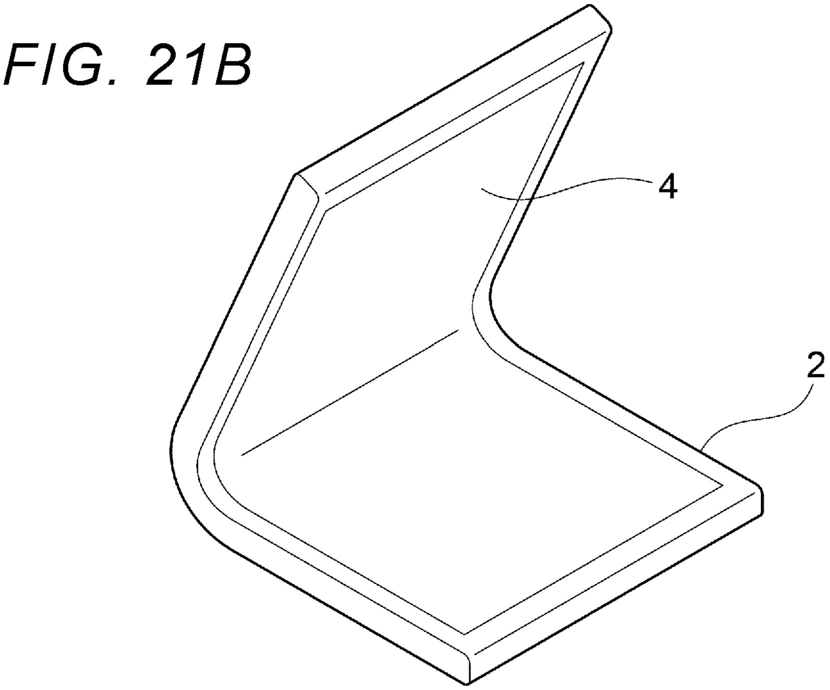

FIGS. 21A and 21B are diagrams illustrating an example of a change in a shape of the information terminal 1A according to the second exemplary embodiment. FIG. 21A illustrates a case where the information terminal 1A is used in a flat state. FIG. 21B illustrates a case where the information terminal 1A is used in a state of being bent at approximately 90°. In FIGS. 21A and 21B, corresponding reference numerals are allocated to elements that correspond to the elements illustrated in FIGS. 20A and 20B.

A hardware configuration of the information terminal 1A used in the present exemplary embodiment is the same as that illustrated in FIG. 4. As in the first exemplary embodiment, the information terminal 1A performs a process of setting brightness for each region on one deformable display surface based on the flowchart illustrated in FIG. 5.

Figure 22:
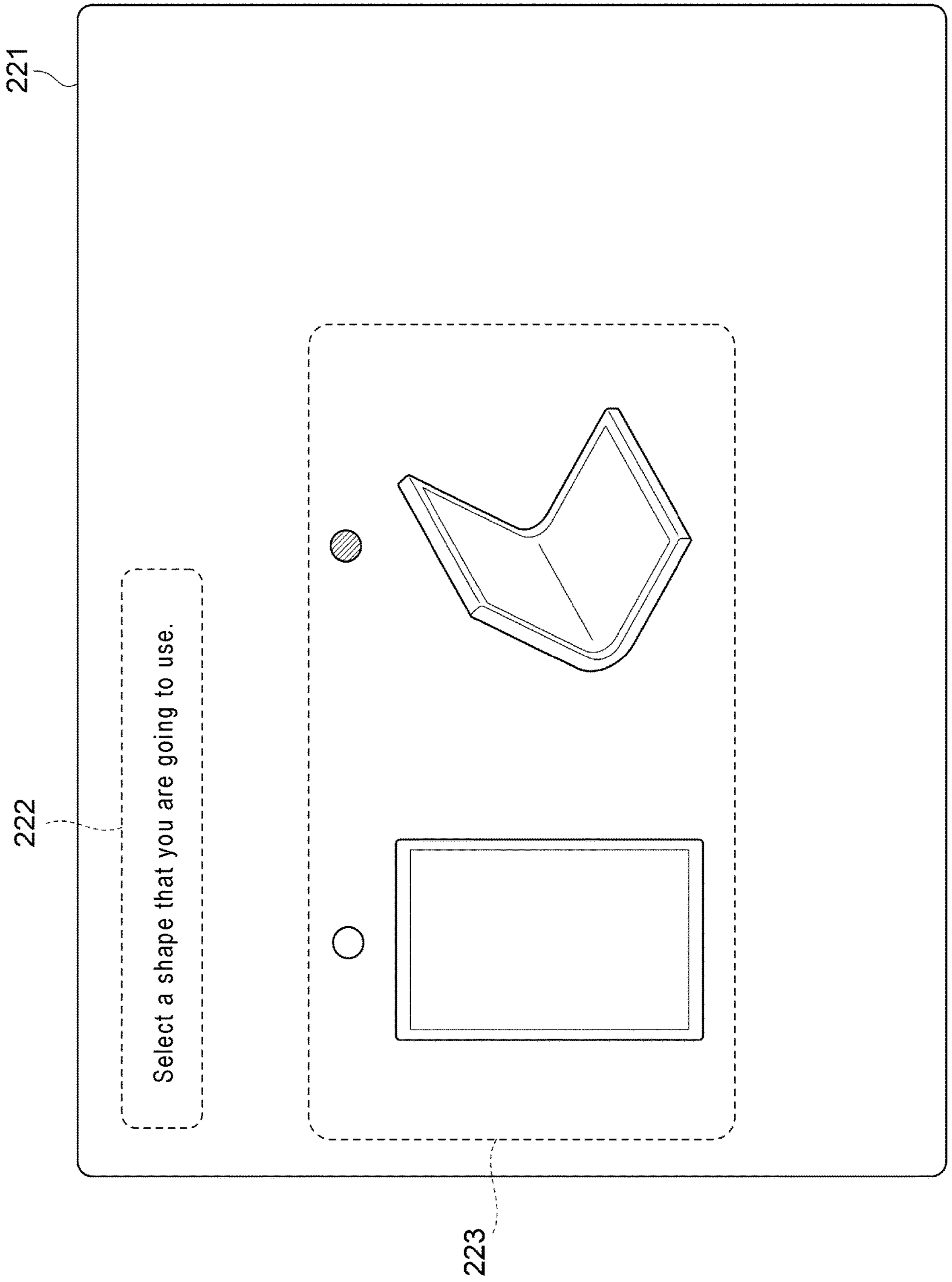
FIG. 22 is a diagram illustrating an example of a screen that receives a shape that the user is going to use.

FIG. 22 is a diagram illustrating an example of a screen 221 that receives a shape that the user is going to use. The screen 221 in FIG. 22 illustrates a sentence 222 describing an operation that the user is requested to conduct and candidates 223 of the shape that the user is going to use.

In the case of FIG. 22, the sentence 222 illustrates "Select a shape that you are going to use". The candidates 223 illustrate two representative shapes. A shape at a left side is a shape in which the display surface is in a flat state. A shape at a right side is a shape in which the display surface is bent into an L shape. It is possible to fold the display surface inside. However, it is not necessary to set brightness in the folded state. Therefore, the screen 221 does not illustrate the folded state as the candidates 223. In the case of FIG. 22, a radio button on the candidate 223 at the right end is selected.

Also in the present exemplary embodiment, when the shape that the user is going to use is set, a region candidate is displayed on the touch panel 4. Similarly to the first exemplary embodiment, after correcting the regions in the displayed candidate, the user sets the brightness for each region, and sets a preference setting and exceptional rules.

Hereinafter, a relationship between the brightness set by the user for each region and control of the brightness of each region in accordance with the shape of the information terminal 1A will be described with reference to FIGS. 23 and 24.

Figure 23A:
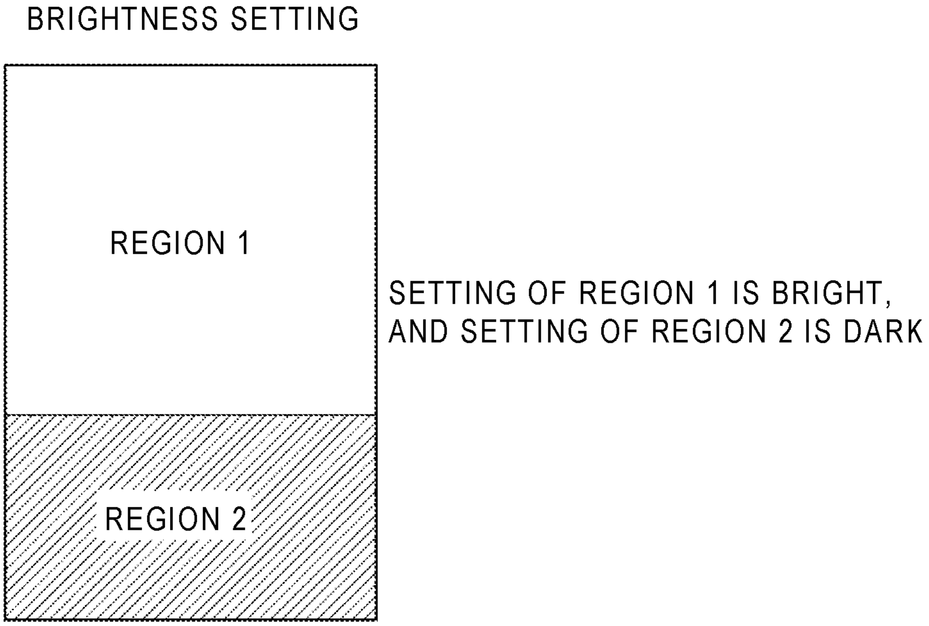
FIGS. 23A and 23B are diagrams illustrating an example of controlling the brightness of each region when the information terminal is bent and used.
Figure 23B:
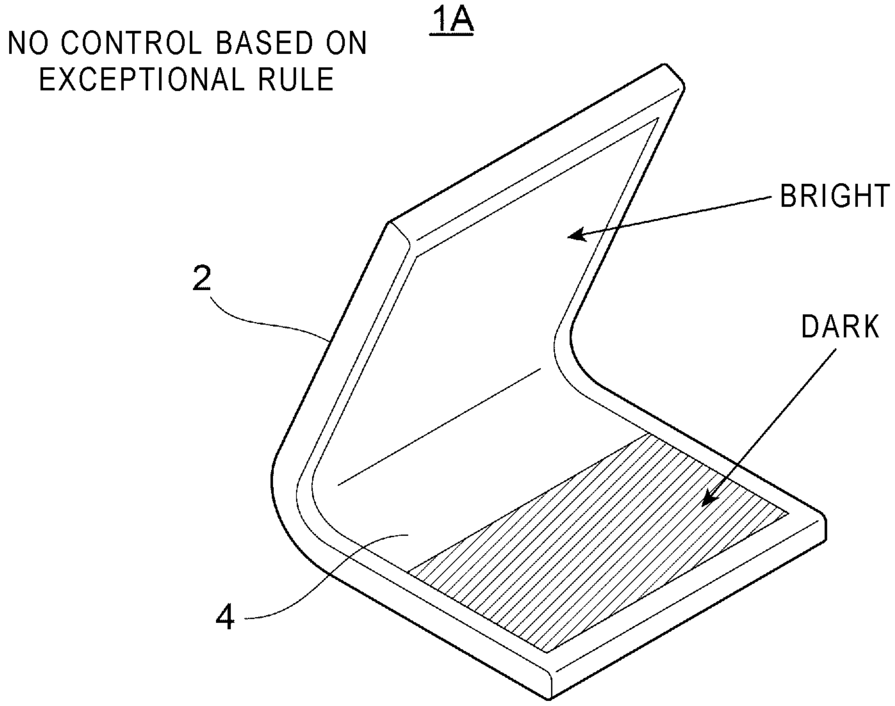

FIGS. 23A and 23B are diagrams illustrating an example of controlling the brightness of each region when the information terminal 1A is bent and used. FIG. 23A illustrates an example of a setting made by the user for each region. FIG. 23B illustrates an example of controlling the brightness of each region of the touch panel 4 during use.

In the example illustrated in FIGS. 23A and 23B, the "REGION 1" is corrected to have an area that is approximately two-thirds of the touch panel 4, and the "REGION 2" is corrected to have an area that is approximately one-third of the touch panel 4. A setting for the "REGION 1" is bright, and a setting for the "REGION 2" is dark.

Therefore, in the example of FIGS. 23A and 23B, the "REGION 1" displayed in a bright state extends beyond the position of the hinge 3A (see FIGS. 20A and 20B).

Figure 24A:
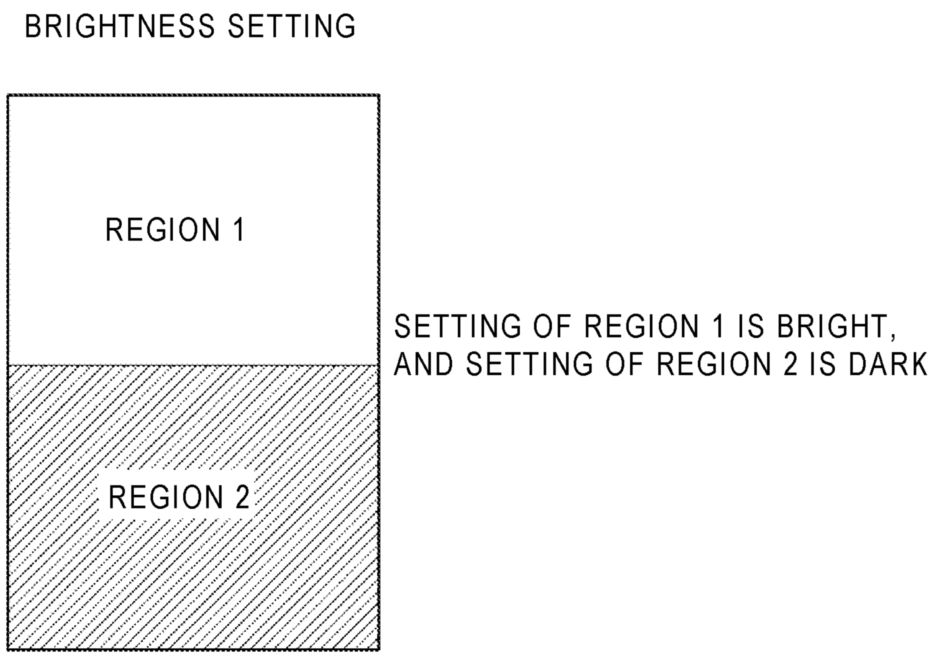
FIGS. 24A and 24B are diagrams illustrating an example of controlling the brightness of each region when the information terminal is used in a flat state.
Figure 24B:
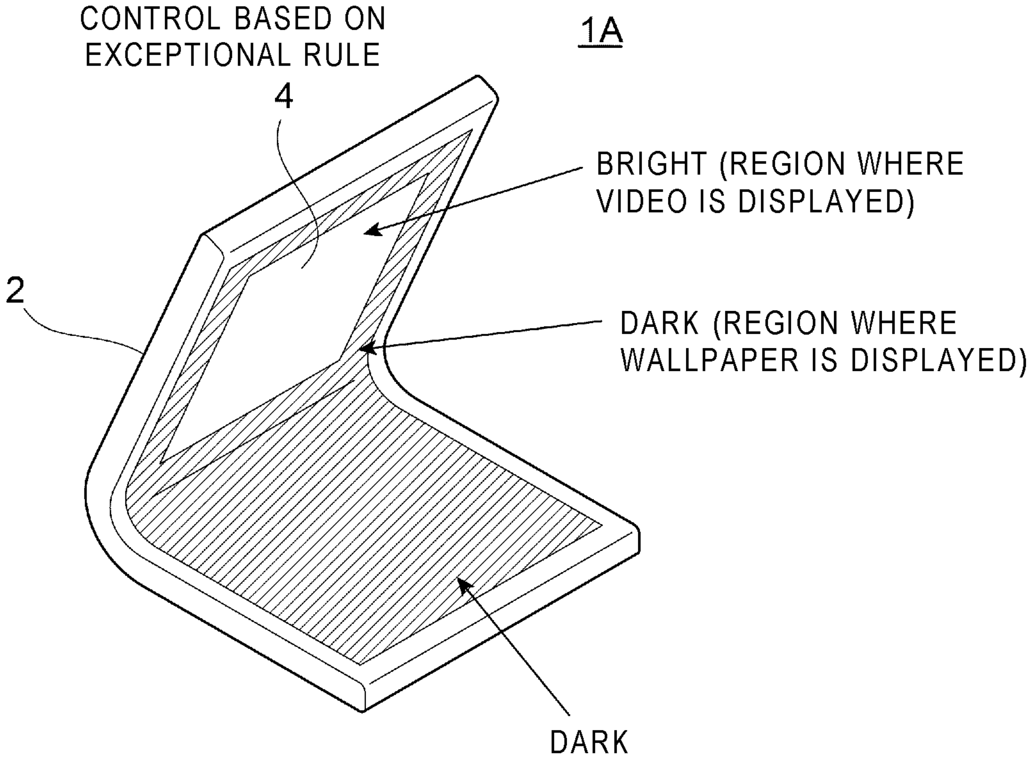

FIGS. 24A and 24B are diagrams illustrating an example of controlling the brightness of each region when the information terminal 1A is used in a state of being bent at approximately 90°. FIG. 24A illustrates an example of a setting made by the user for each region. FIG. 24B illustrates an example of controlling the brightness of each region of the touch panel 4 during use.

In the case of FIGS. 24A and 24B, the touch panel 4 is used in the state of being bent at approximately 90°, the setting for the "REGION 1" above the hinge 3A (see FIGS. 20A and 20B) is bright, and the setting for the "REGION 2" below the hinge 3A is dark. In the example of FIGS. 24A and 24B, a video is displayed in a central portion of the display surface corresponding to the "REGION 1", and a wallpaper is displayed in the periphery thereof. In the example illustrated in FIGS. 24A and 24B, the exceptional rule is valid for darkening brightness of the region where the wallpaper is displayed. Therefore, in the "REGION 1" having the bright setting, the peripheral portion where the wallpaper is displayed is changed into a dark state.

Third Exemplary Embodiment

Figure 25A:
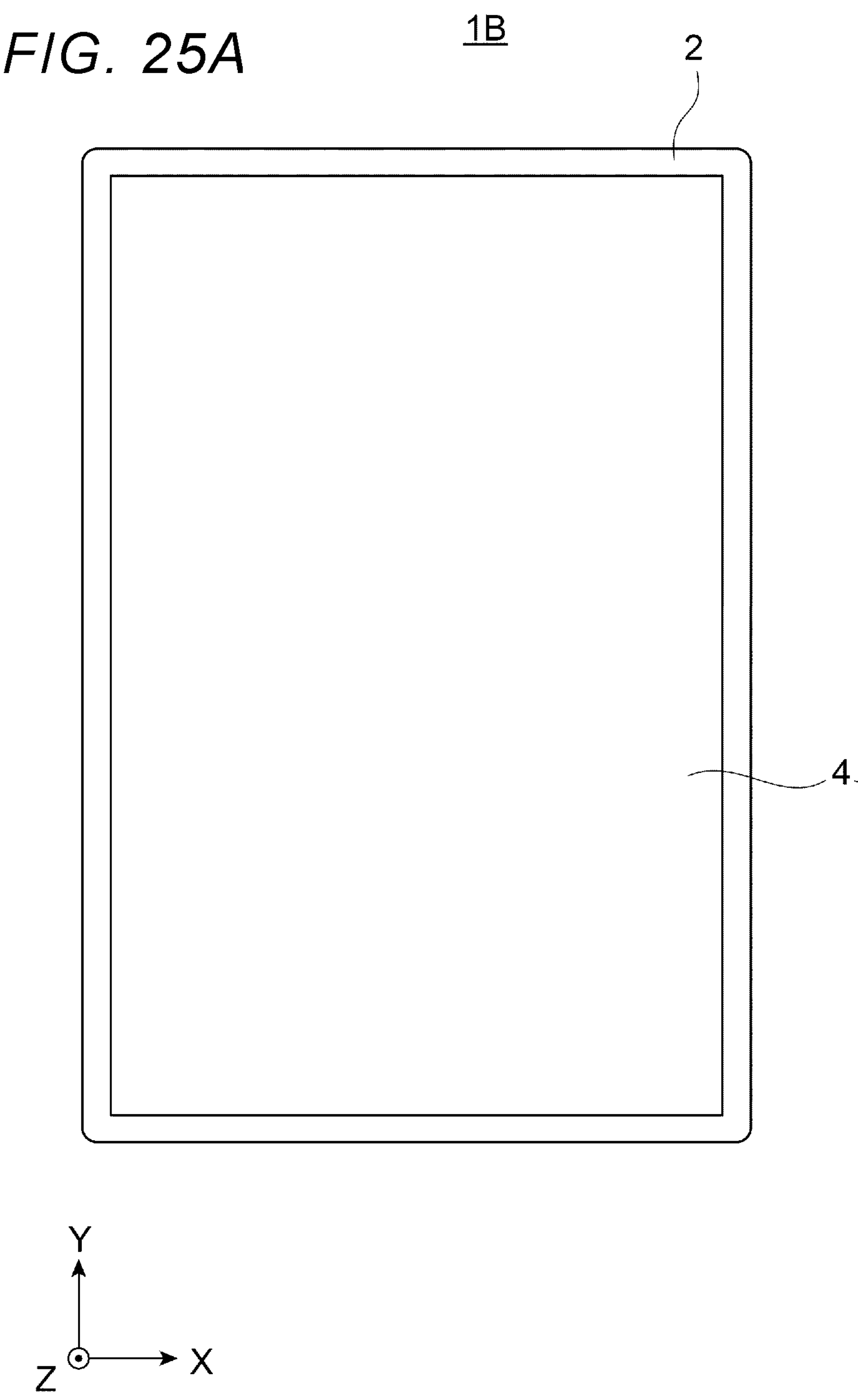
FIGS. 25A and 25B are diagrams illustrating an example of an external configuration of an information terminal used in a third exemplary embodiment.
Figure 25B:
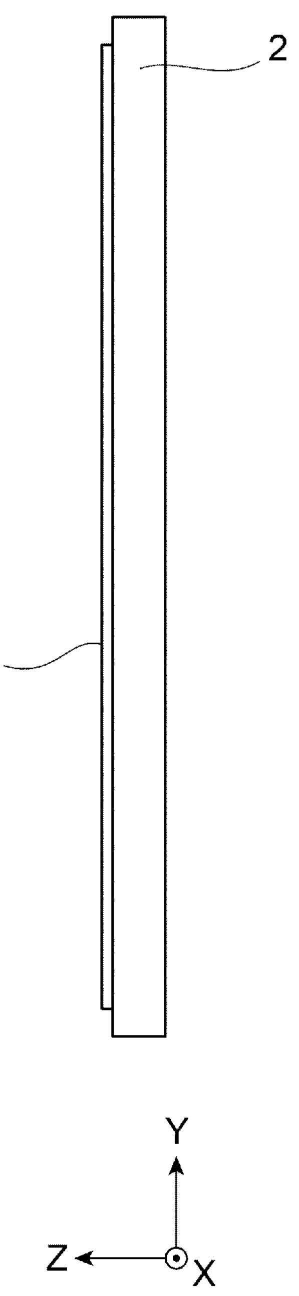

FIGS. 25A and 25B are diagrams illustrating an example of an external configuration of an information terminal 1B used in a third exemplary embodiment. FIG. 25A is a front view of the information terminal 1B. FIG. 25B is a side view of the information terminal 1B. In FIGS. 25A and 25B, corresponding reference numerals are allocated to elements that correspond to the elements illustrated in FIGS. 1A and 1B. The information terminal 1B is also an example of the information processing device.

Members constituting the information terminal 1B illustrated in FIGS. 25A and 25B are basically the same as those in the first exemplary embodiment. It is noted that the body 2 constituting the information terminal 1B is more flexible than the body 2 (see FIGS. 1A and 1B) used in the first exemplary embodiment. The body 2 used in the present exemplary embodiment is not provided with the hinge 3 (see FIGS. 1A and 1B). Therefore, the body 2 used in the present exemplary embodiment can be deformed at plural portions of the body 2 unlike the cases of the first and second exemplary embodiments.

Figure 26A:
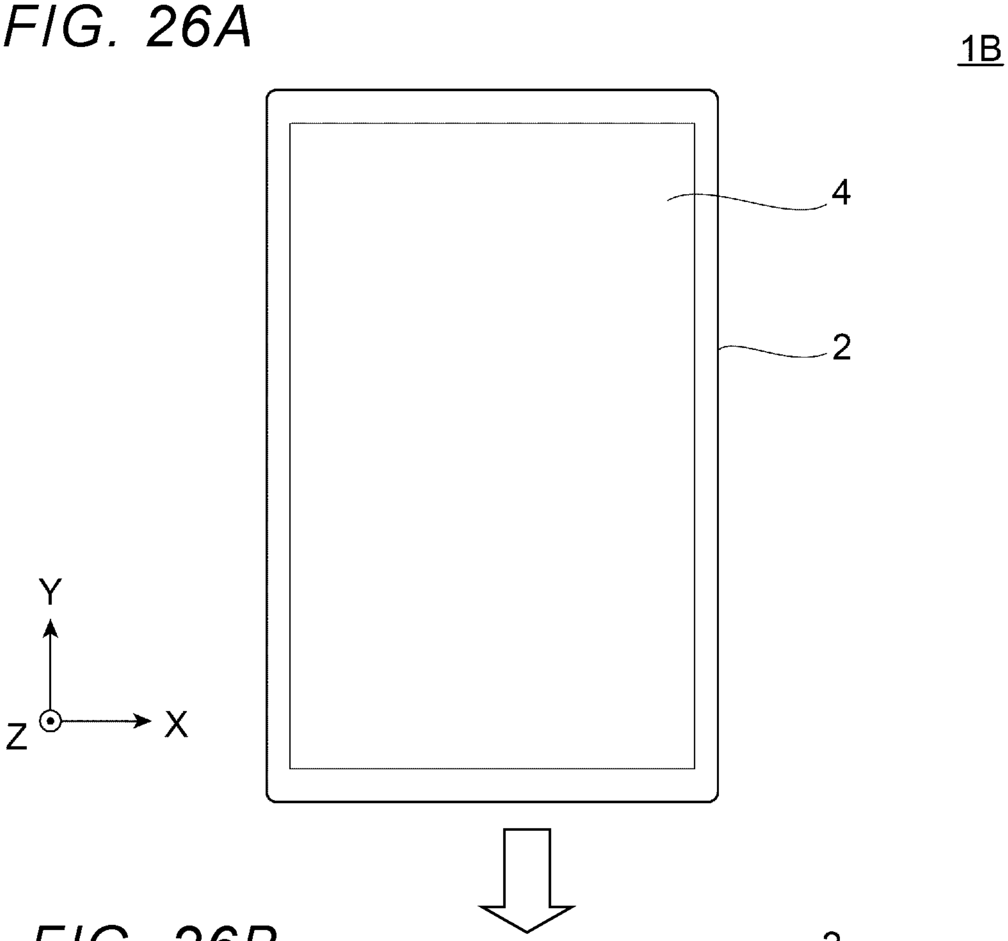
FIGS. 26A and 26B are diagrams illustrating an example of a change in a shape of the information terminal according to the third exemplary embodiment.
Figure 26B:
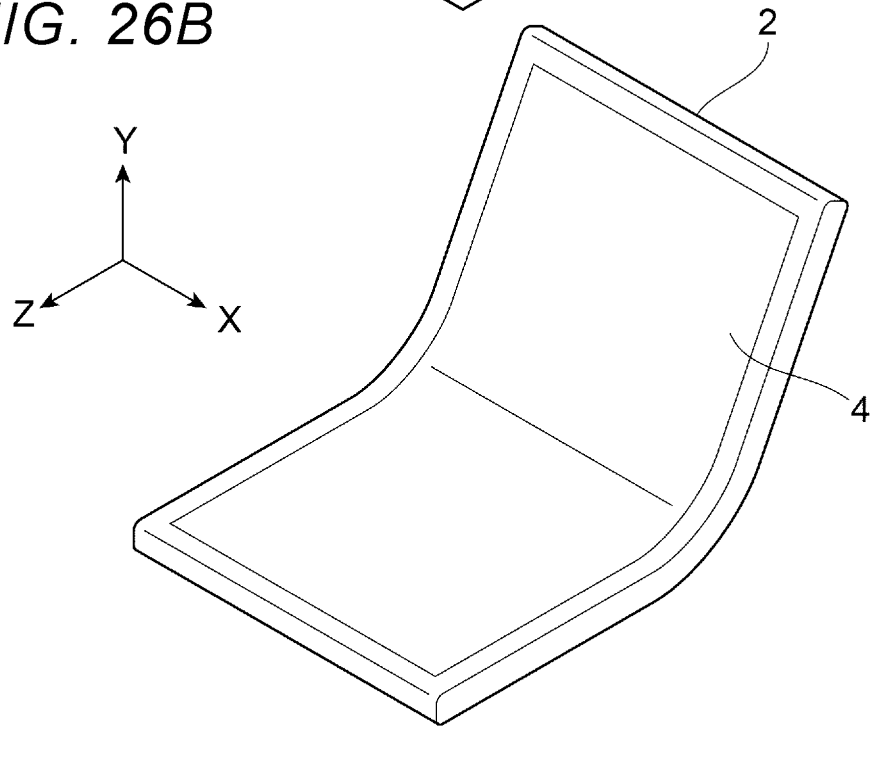

FIGS. 26A and 26B are diagrams illustrating an example of a change in a shape of the information terminal 1B according to the third exemplary embodiment. FIG. 26A illustrates a case where the information terminal 1B is used in a flat state. FIG. 26B illustrates a case where the information terminal 1B is used in a state of being curved in the vicinity of an approximate center of a long side of the information terminal 1B. In the case of FIGS. 26A and 26B, the information terminal 1B is deformed so that a surface on which the touch panel 4 is provided is located on the inside. In the present exemplary embodiment, since the body 2 is not provided with the hinge 3 (see FIGS. 1A and 1B), the body 2 and the touch panel 4 are gently curved.

Figures 27A, 27B, 27C:
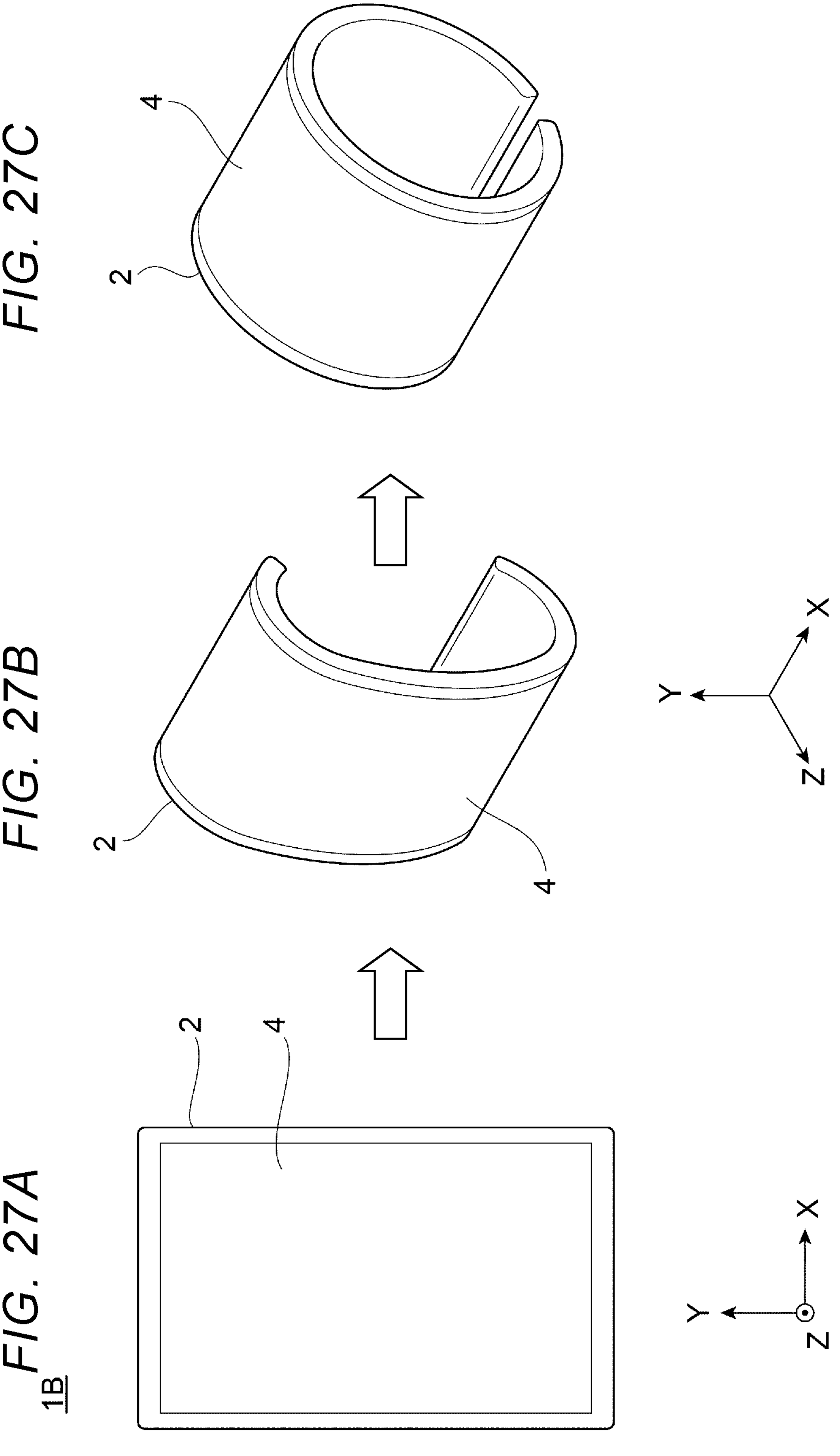
FIGS. 27A to 27C are diagrams illustrating an example of changes in the shape of the information terminal according to the third exemplary embodiment.

FIGS. 27A to 27C are diagrams illustrating an example of changes in a shape of the information terminal 1B according to the third exemplary embodiment. FIG. 27A illustrates a case where the information terminal 1B is used in the flat state. FIG. 27B illustrates a case where the information terminal 1B is used in a state of being curved into a C shape. FIG. 27C illustrates a case where the information terminal 1B is used in a state of being curved in an approximately cylindrical shape. In the case of FIGS. 27A to 27C, the information terminal 1B is deformed so that the surface on which the touch panel 4 is provided is located on the outside.

The shapes illustrated in FIGS. 26A to 27C are mere examples. The information terminal 1B may be deformed so that a diagonal line of the information terminal 1B becomes a ridge line or a valley line. Further alternatively, the information terminal 1B may be deformed into a W or V shape.

Figure 28:
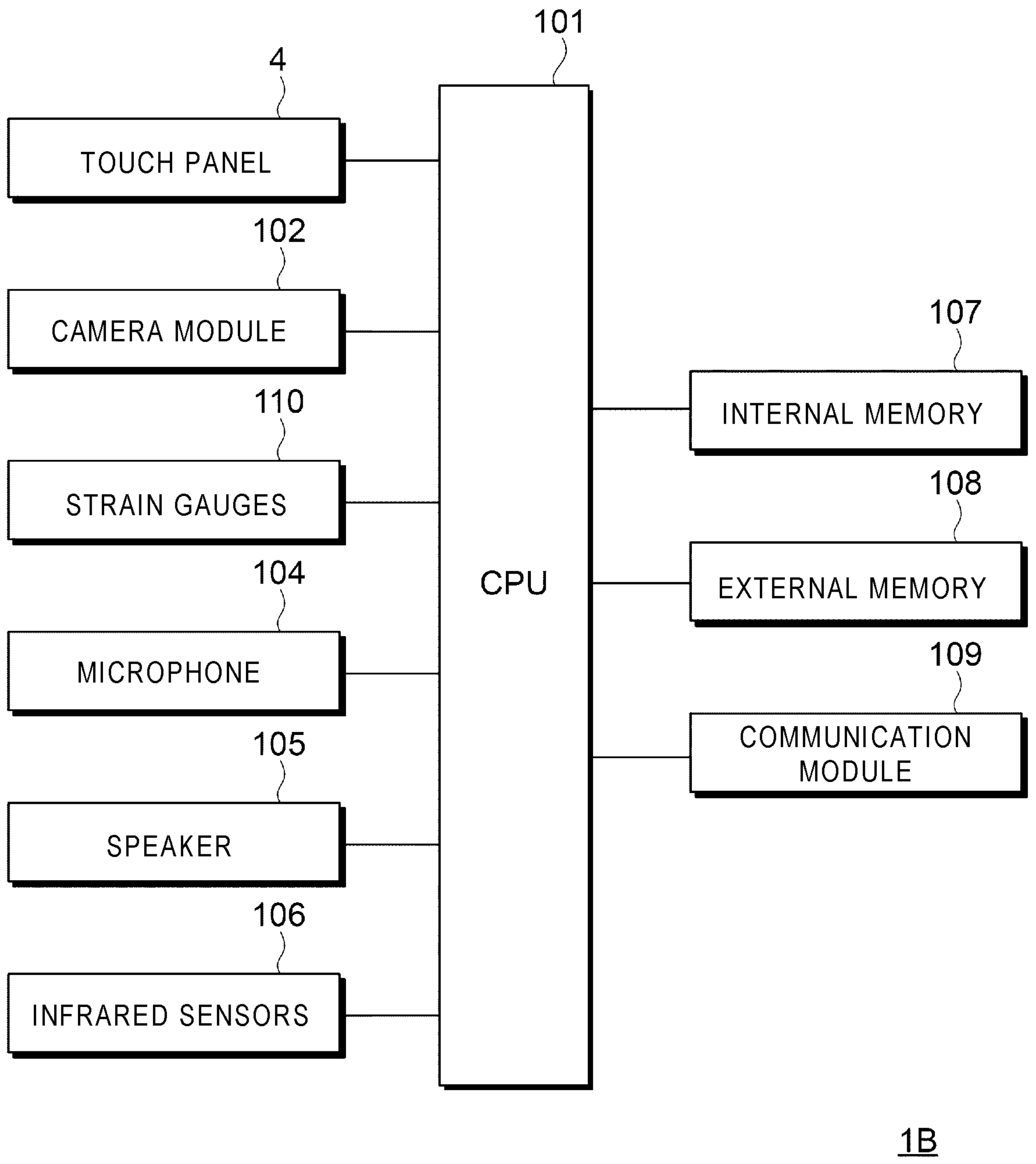
FIG. 28 is a diagram illustrating an example of a hardware configuration of the information terminal.

FIG. 28 is a diagram illustrating an example of a hardware configuration of the information terminal 1B. In FIG. 28, corresponding reference numerals are allocated to elements that correspond to the elements illustrated in FIG. 4.

The information terminal 1B used in the present exemplary embodiment includes the CPU 101 that controls each unit by executing a program, the touch panel 4, the camera module 102, strain gauges 110, the microphone 104 used for calls and recordings, the speaker 105 used to reproduce a sound, the infrared sensor 106, the internal memory 107 that stores system data and internal data, the detachable external memory 108, and the communication module 109 used for communication with an external device.

In the present exemplary embodiment, since neither the hinge 3 (see FIGS. 1A and 1B) nor the hinge 3A (see FIGS. 20A and 20B) is used, the strain gauges 110 each of which measures a strain acting on a corresponding part are provided instead of the hinge angle sensor 103 (see FIG. 4). In the present exemplary embodiment, a metal strain gauge in which a resistor is disposed on an insulator is used as the strain gauge 110. The metal strain gauge outputs a degree of deformation of a part on which the metal strain gauge is provided, as a change in resistance of the resistor.

Figure 29:
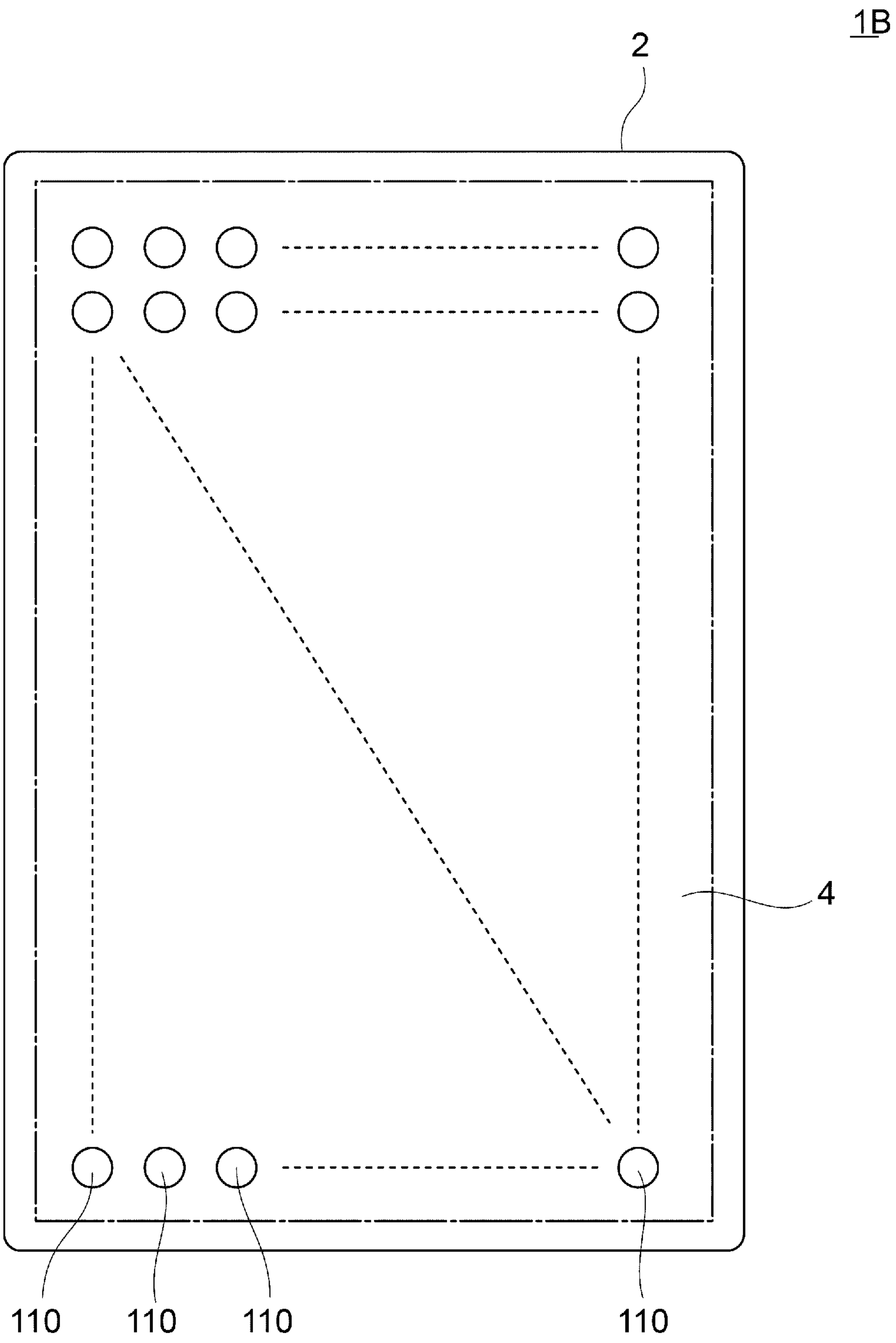
FIG. 29 is a diagram illustrating an arrangement example of strain gauges in the information terminal.

FIG. 29 is a diagram illustrating an arrangement example of the strain gauges 110 for the information terminal 1B. In the present exemplary embodiment, the strain gauges 110 are provided in a layer between the touch panel 4 and the body 2. In the case of FIG. 29, the plural strain gauges 110 are disposed on the entire surface of the touch panel 4 at equal intervals. The strain gauges 110 may be disposed in a frame region which is an outer periphery of the touch panel 4. In the present exemplary embodiment, a state of the deformed touch panel 4 is estimated based on a distribution of magnitudes of the strains output from the plural strain gauges 110.

As in the first exemplary embodiment, the information terminal 1B used in the present exemplary embodiment performs a process of setting brightness for each region on one deformable display surface based on the flowchart illustrated in FIG. 5.

Figure 30:
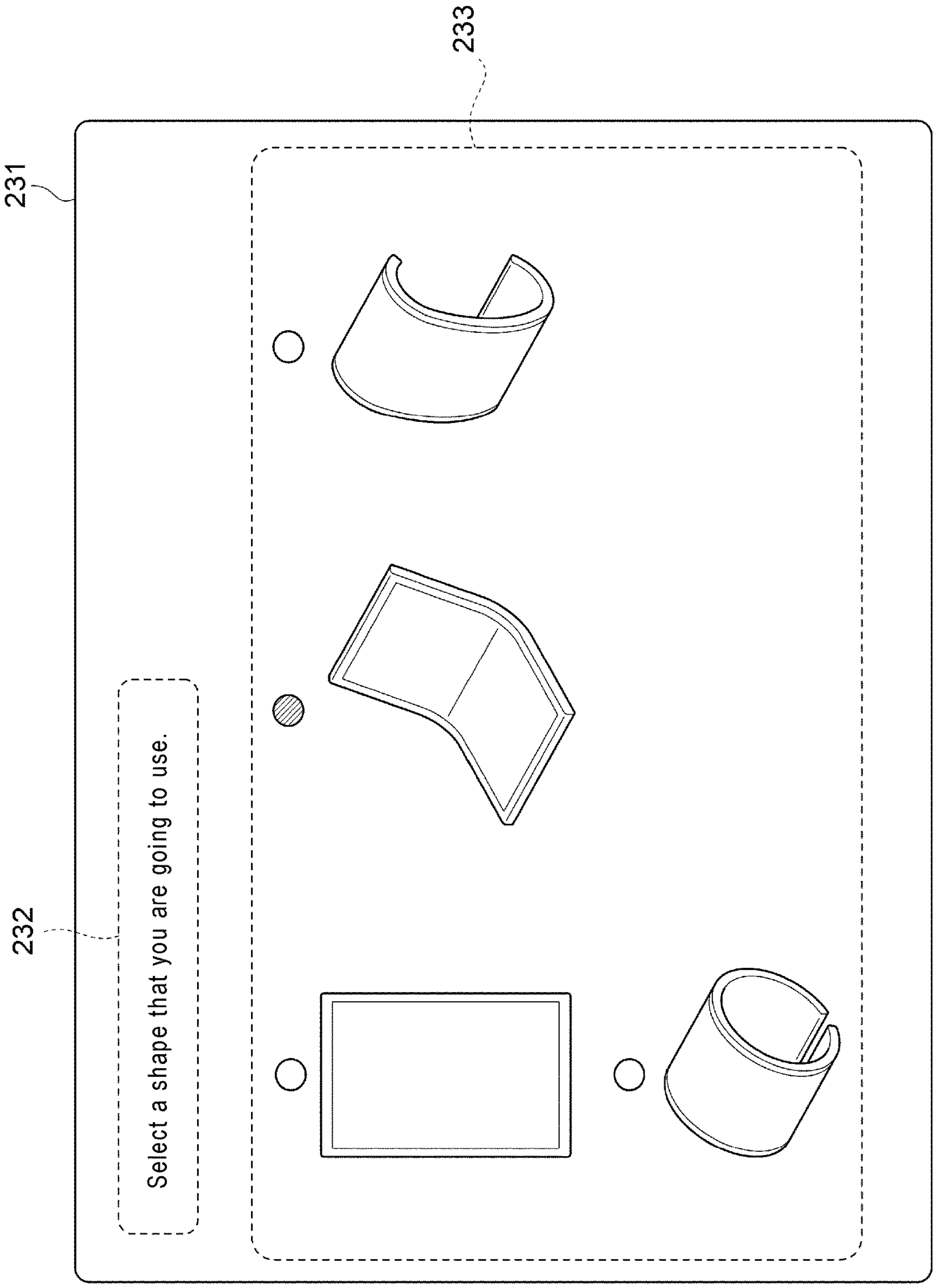
FIG. 30 is a diagram illustrating an example of a screen that receives a shape that the user is going to use.

FIG. 30 is a diagram illustrating an example of a screen 231 that receives a shape that the user is going to use. The screen 231 illustrated in FIG. 30 illustrates a sentence 232 describing an operation that the user is requested to conduct and candidates 233 of the shape that the user is going to use.

The sentence 232 in FIG. 30 also illustrates "Select a shape that you are going to use". The candidates 233 illustrate four representative shapes. A shape at an upper left end is a shape in which the display surface is in a flat state. A shape at an upper middle is a shape in which the display surface is curved inward. A shape at an upper right end is a shape in which the display surface is curved outward. A shape at a lower left end is a shape in which the display surface is curved outward in a cylindrical shape. In the case of FIG. 30, a radio button on the upper middle candidate 233 is selected.

Also in the present exemplary embodiment, when the shape that the user is going to use is set, a region candidate is displayed on the touch panel 4. Similarly to the first exemplary embodiment, after correcting the regions in the displayed candidate, the user sets the brightness for each region, and sets a preference setting and exceptional rules.

Fourth Exemplary Embodiment

The above-described first exemplary embodiment describes the information terminal 1 (see FIGS. 1A and 1B) having a structure in which the touch panel 4 can be bent at the position where the hinge 3 (see FIGS. 1A and 1B) is attached in such a direction that the touch panel 4 is located on a ridge side. The second exemplary embodiment describes the information terminal 1A (see FIGS. 20A and 20B) having a structure in which the touch panel 4 is bent at the position where the hinge 3A (see FIGS. 20A and 20B) is attached in such a direction that the touch panel 4 is located on a valley side.

The present exemplary embodiment will describe on an information terminal having these two types of hinges 3 and 3A.

Figure 31A:
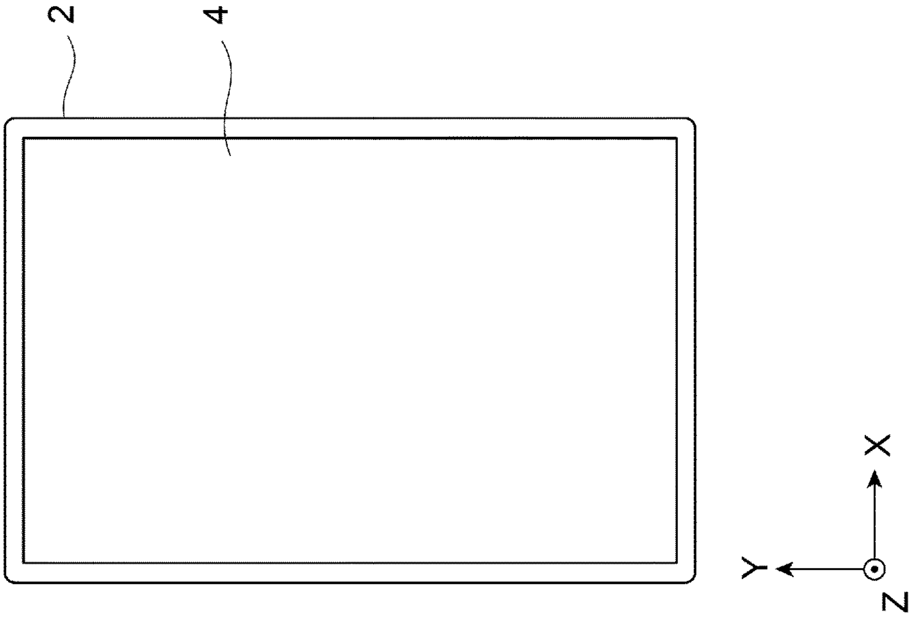
FIGS. 31A to 31C are diagrams illustrating an example of an external configuration of an information terminal used in a fourth exemplary embodiment.
Figure 31B:
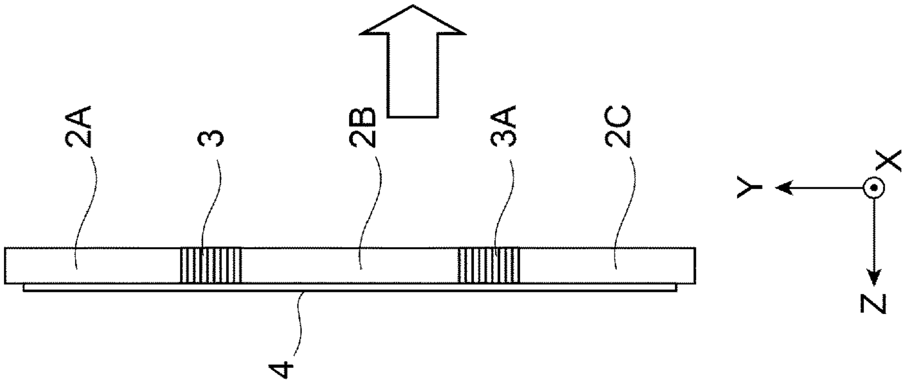
Figure 31C:
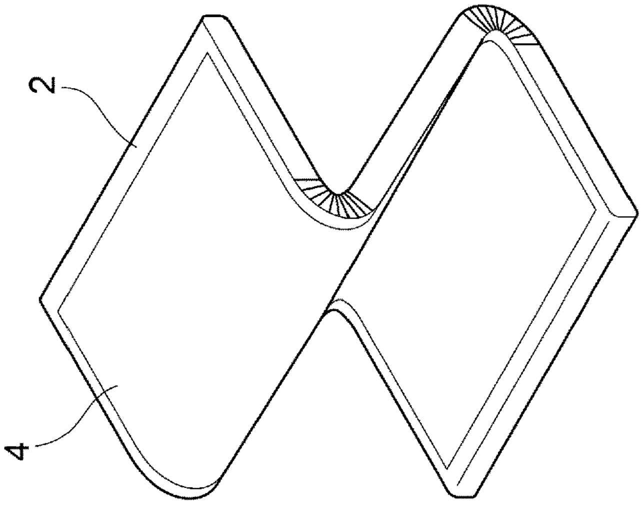

FIGS. 31A to 31C are diagrams illustrating an example of an external configuration of an information terminal 1C used in a fourth exemplary embodiment. FIG. 31A is a front view of the information terminal 1C. FIG. 31B is a side view of the information terminal 1C. FIG. 31C is a diagram illustrating an example of a shape of the deformed information terminal 1C. In FIGS. 31A to 31C, corresponding reference numerals are allocated to elements that correspond to the elements illustrated in FIGS. 1A, 1B, 20A, and 20B. The information terminal 1C is also an example of the information processing device.

Members constituting the information terminal 1C illustrated in FIGS. 31A to 31C are basically the same as those in the first exemplary embodiment. In the present exemplary embodiment, the hinge 3 whose rotation range is in a direction opposite to a surface on which the touch panel 4 is provided and the hinge 3A whose rotation range is in a direction of the surface on which the touch panel 4 is provided are used. Therefore, the body 2 includes three body panels 2A, 2B, and 2C. The body panel 2A and the body panel 2B are coupled to each other by the hinge 3. The body panel 2B and the body panel 2C are coupled to each other by the hinge 3A. Therefore, as illustrated in FIG. 31C, the information terminal 1C can be deformed into a Z shape when viewed from a side.

Figure 32A:
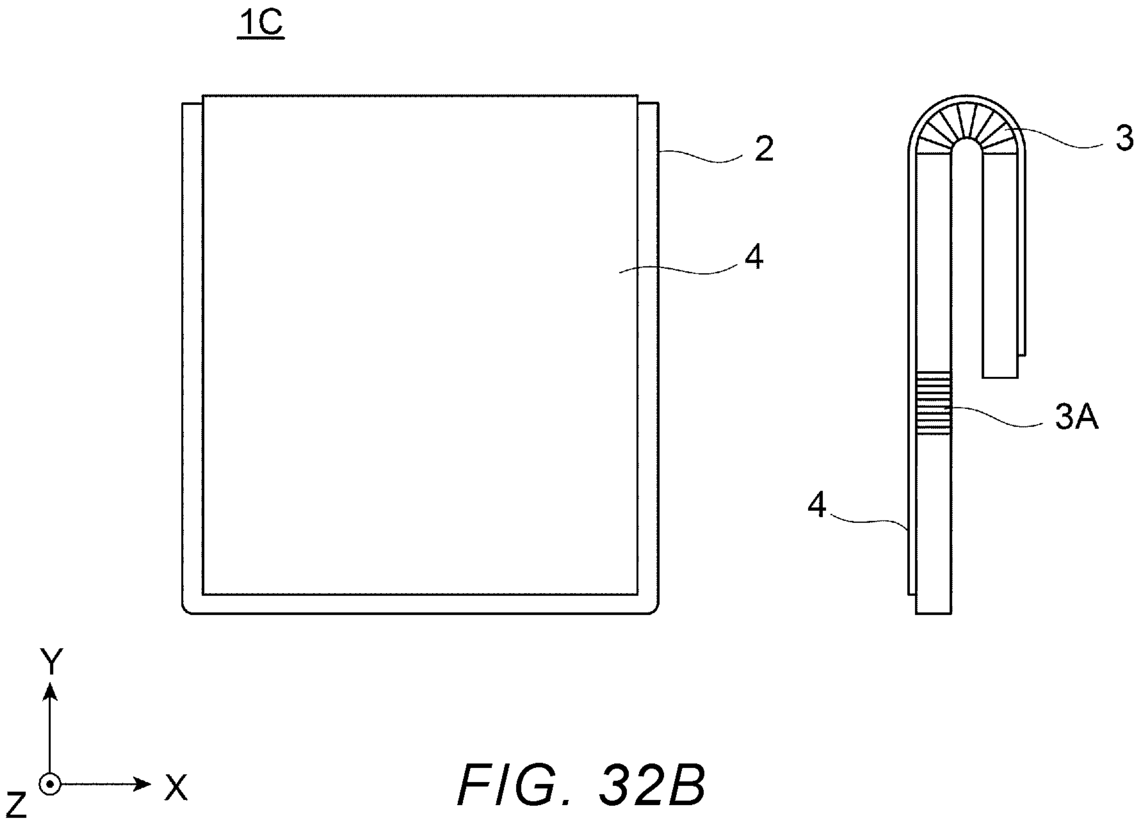
FIGS. 32A and 32B are diagrams illustrating another modification of the information terminal used in the fourth exemplary embodiment.
Figure 32B:
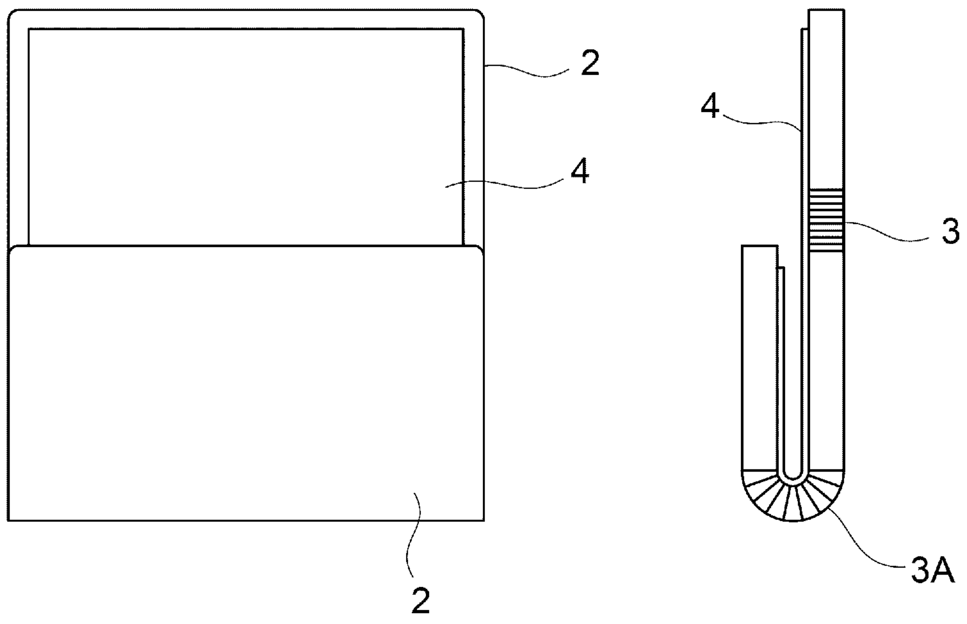

FIGS. 32A and 32B are diagrams illustrating another modification of the information terminal 1C used in the fourth exemplary embodiment. FIG. 32A illustrates a state where the touch panel 4 is folded at a position of the hinge 3 so that the touch panel 4 is located on the ridge side. FIG. 32B illustrates a state where the touch panel 4 is folded at a position of the hinge 3A so that the touch panel 4 is located on the valley side.

In the case of FIG. 32A, two-thirds of the display surface can be observed, whereas in the case of FIG. 32B, only one-third of the display surface can be observed. The reason is that, in the case of FIG. 32B, the body 2 without the touch panel 4 covers the display surface.

Therefore, when the shape illustrated in FIG. 32B is designated as a shape that the user is going to use, a luminance value of a portion of a region that is not observed from an outside due to the folding is set to zero without waiting for the brightness setting by the user.

Fifth Exemplary Embodiment

In the above-described exemplary embodiment, it is assumed that the information terminal 1 (see FIGS. 1A and 1B) having the deformable touch panel 4 is a tablet computer or a smartphone. The present exemplary embodiment will describe an information terminal in which a part of a display surface is of a winding type.

Figure 33:
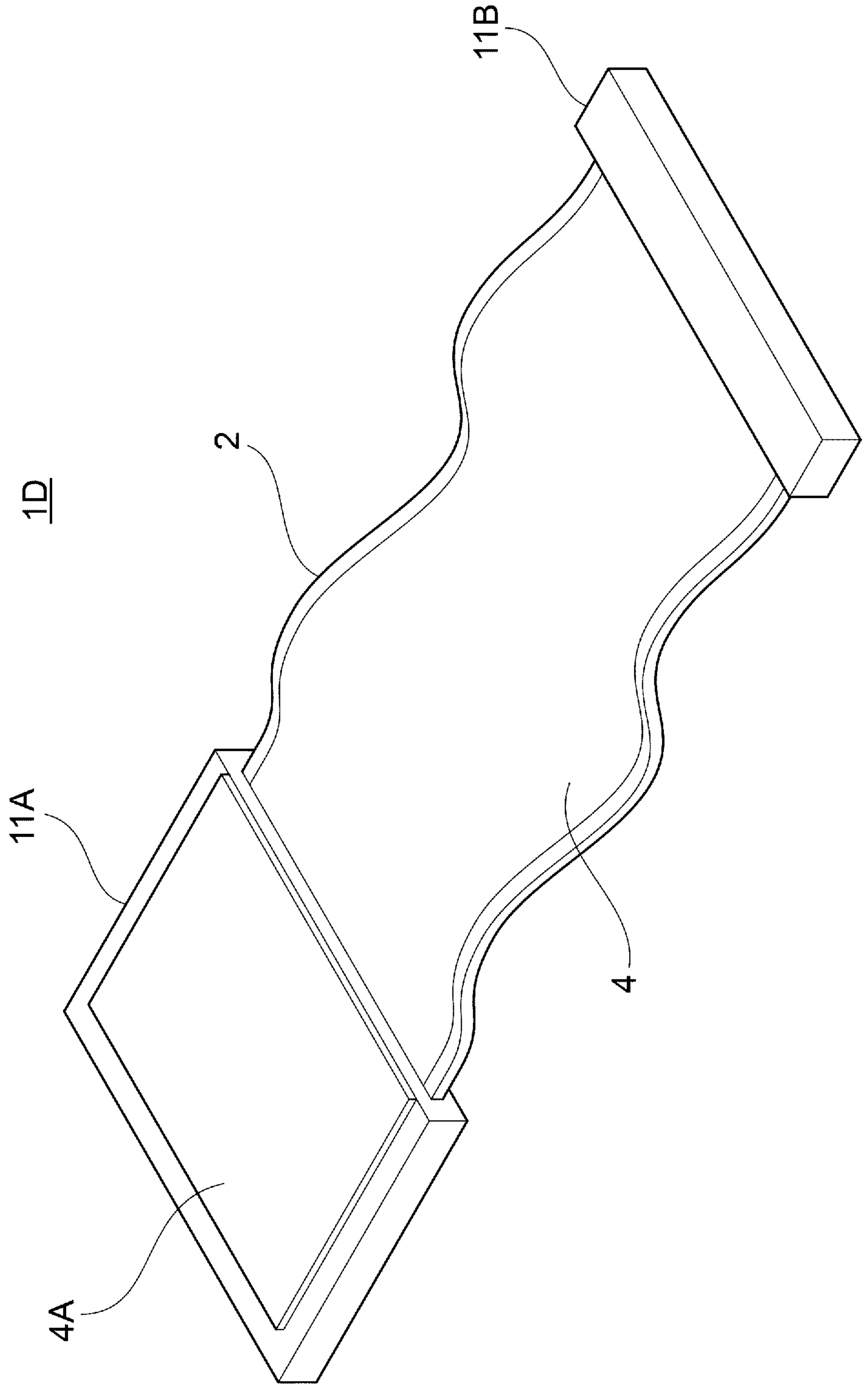
FIG. 33 is a diagram illustrating an example of an external configuration of an information terminal used in a fifth exemplary embodiment.

FIG. 33 is a diagram illustrating an example of an external configuration of an information terminal 1D used in a fifth exemplary embodiment. The information terminal 1D is also an example of the information processing device.

The information terminal 1D illustrated in FIG. 33 includes a device body 11A and a drawer member 11B. The device body 11A accommodates a film-shaped body 2 provided with one touch panel 4 having a deformable display surface in a wound state. The drawer member 11B is attached to one end of the body 2.

In the present exemplary embodiment, a touch panel 4A is provided on a surface of device body 11A that is located on a side where the touch panel 4 is provided.

Therefore, when the entire film-shaped body 2 is wound and accommodated in the device body 11A, an image is displayed only on the touch panel 41.

On the other hand, when the body 2 is pulled out from the device body 11A, the image is displayed so that the touch panel 4A on the device body 11A side and the touch panel 4 provided on the body 2 form one display surface. In other words, an image displayed on the touch panel 4A and an image displayed on the touch panel 4 are displayed so as to be continuous to each other.

In the present exemplary embodiment, for example, brightness settings may be made for a portion of a region that is still accommodated in the device body 11A and for a portion of a region that is pulled out from the device body 11A, respectively. For example, plural regions may be set in the portion of the region that is pulled out from the device body 11A, and the brightness may be set for each of the plural regions.

It is noted that the touch panel 4A may not be provided on the device body 11A. Also, the drawer member 11B may not be provided.

Sixth Exemplary Embodiment

The above-described exemplary embodiments assume that the information terminal 1 (see FIGS. 1A and 1B) is deformed so that a distance between short sides of a display surface becomes closer than that when the information terminal is used in a flat state. Alternatively, a direction of deformation may be another direction.

Figure 34A:
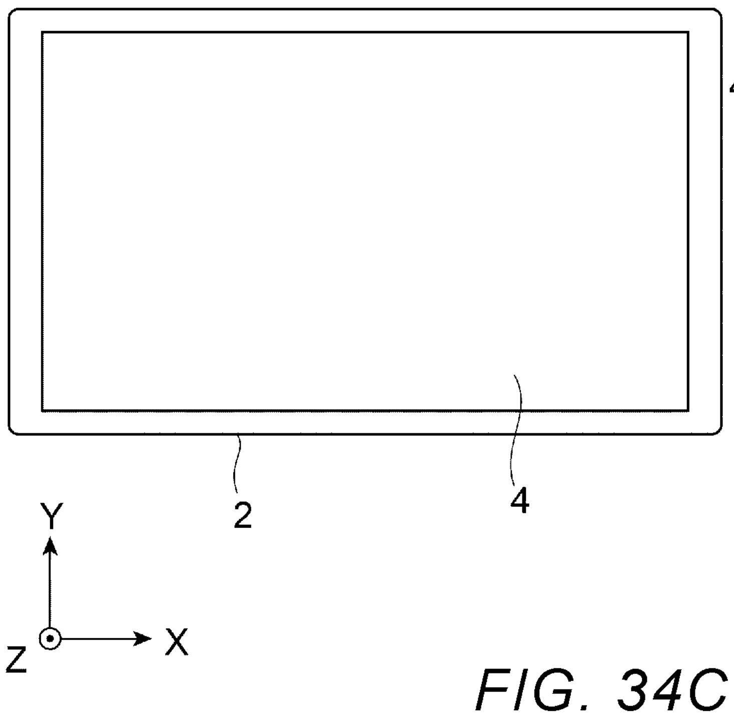
FIGS. 34A to 34C are diagrams illustrating an example of an external configuration of an information terminal used in a sixth exemplary embodiment.
Figure 34B:
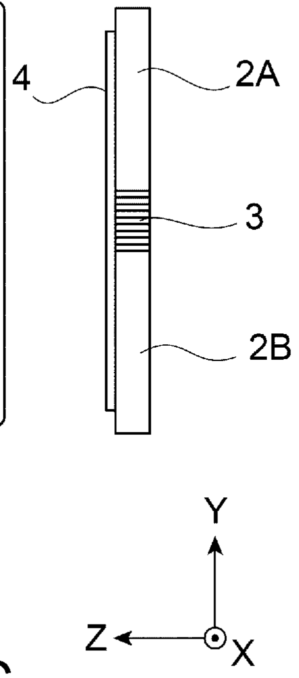
Figure 34C:
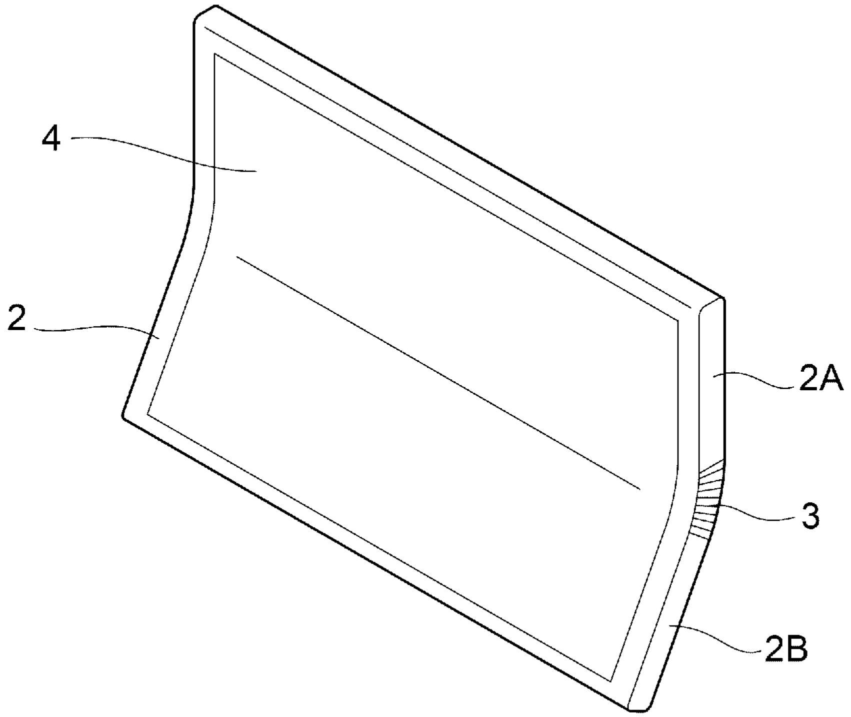

FIGS. 34A to 34C are diagrams illustrating an example of an external configuration of an information terminal 1E used in a sixth exemplary embodiment. FIG. 34A is a front view of the information terminal 1E. FIG. 34B is a side view of the information terminal 1C. FIG. 34C is a diagram illustrating an example of a shape of the deformed information terminal 1E. The information terminal 1E is also an example of the information processing device.

Members constituting the information terminal 1E illustrated in FIGS. 34A to 34C are basically the same as those in the first exemplary embodiment. A difference is that the hinge 3 is attached to a short side. Therefore, as illustrated in FIG. 34C, the information terminal 1E according to the present exemplary embodiment is deformed so that a distance between long sides of the display surface becomes closer than that when the information terminal 1E is used in a flat state.

FIG. 34C illustrates an example in which the touch panel 4 is bent inward so that the touch panel 4 is located on a valley side. Alternatively, the information terminal 1E may be bent outward so that a surface on which the touch panel 4 is provided is located on the ridge side as in the case of the first exemplary embodiment.

The information terminal 1E may be configured without the hinge 3 as in the third exemplary embodiment. The information terminal 1E may include the hinge 3 and the hinge 3A having different movable ranges as in the fourth exemplary embodiment.

The information terminal 1E may be accommodated so that the short side of the display surface is pulled out from the device body 11A (see FIG. 33) as in the fifth exemplary embodiment. In this case, the hinge 3 is unnecessary.

Seventh Exemplary Embodiment

The above-described exemplary embodiments describe that the brightness is set for each region premised on that a display unit is deformed. The brightness may be set for each region when another device prepared independently of the information terminal 1 (see FIGS. 1A and 1B) is disposed on a part of the display surface.

Figure 35A:
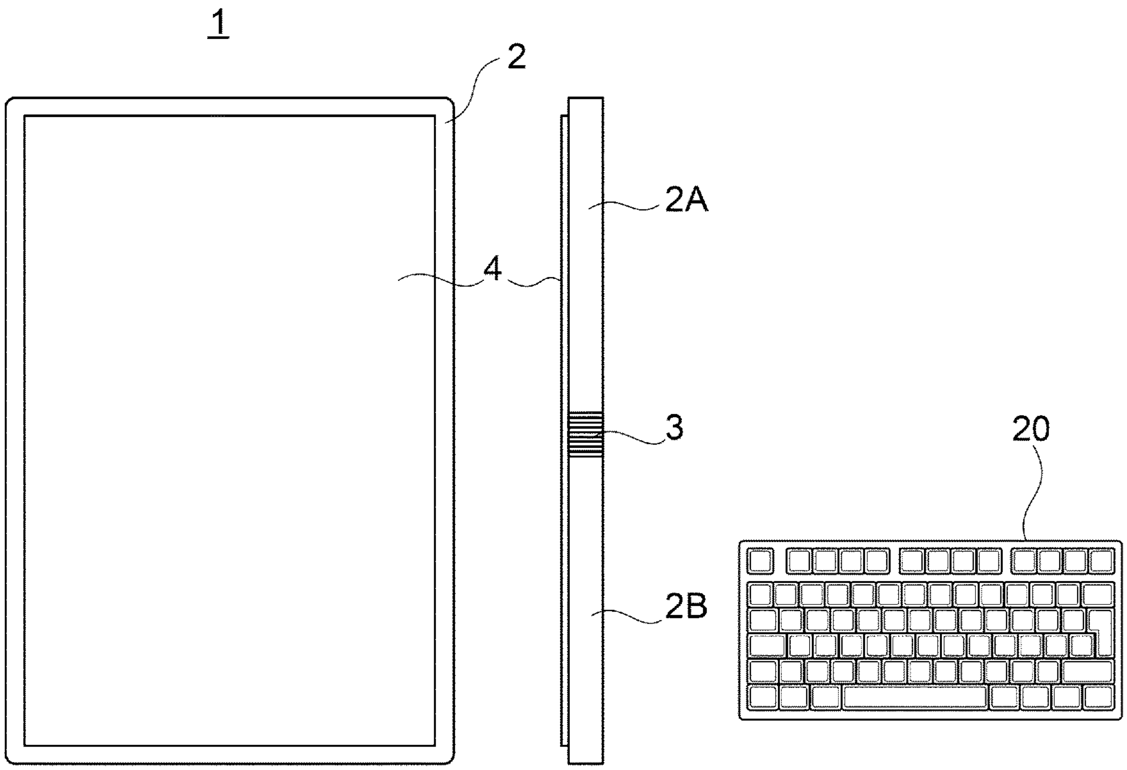
FIGS. 35A and 35B are diagrams illustrating an example of an external configuration of an information terminal used in a seventh exemplary embodiment, FIG. 35A includes a front view and a side view of the information terminal and a front view of a keyboard.
Figure 35B:
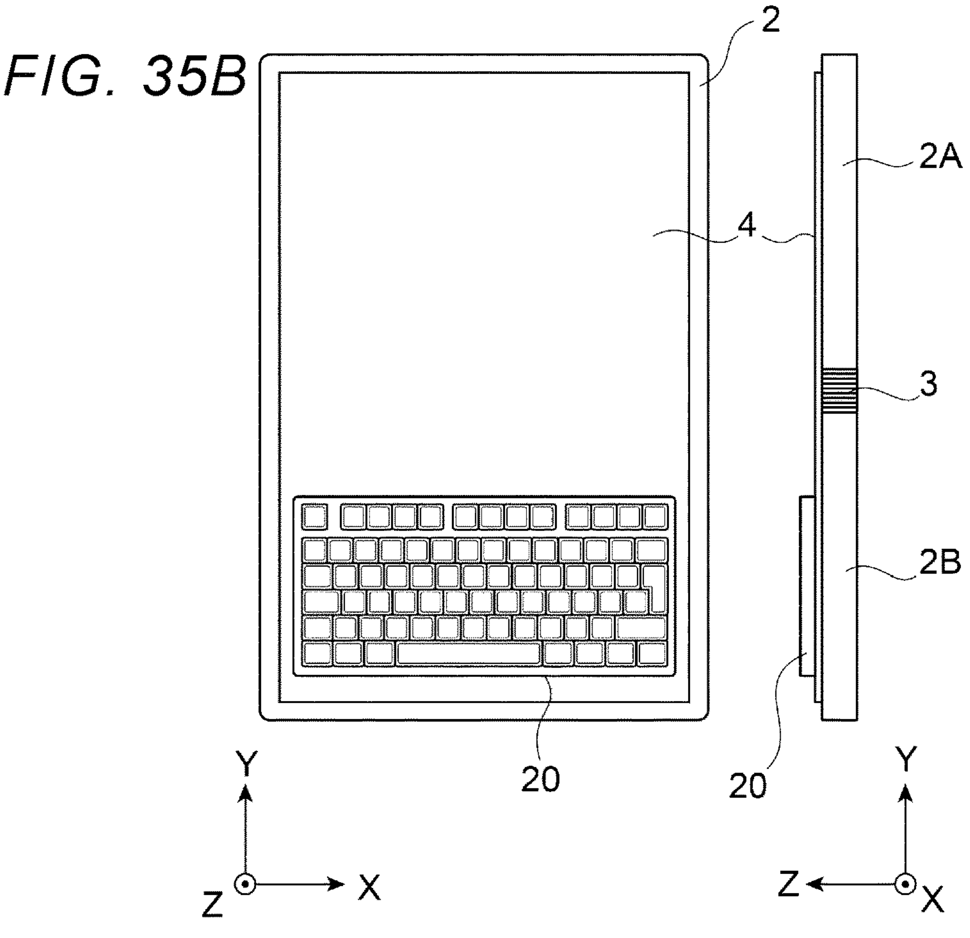

FIGS. 35A and 35B are diagrams illustrating an example of an external configuration of the information terminal 1 used in a seventh exemplary embodiment. FIG. 35A is a front view and a side view of the information terminal 1 and a front view of a keyboard 20. FIG. 35B is a diagram illustrating a usage example in which the keyboard 20 is disposed on the display surface of the information terminal 1. In FIGS. 35A and 35B, corresponding reference numerals are allocated to elements that correspond to the elements illustrated in FIGS. 1A and 1B.

The information terminal 1 assumed in the present exemplary embodiment is the same as the information terminal 1 described in the first exemplary embodiment.

A difference is that the keyboard 20 on which physical keys are arranged is used by overlapping the keyboard 20 on a part of the regions of the display surface of the information terminal 1. In the present exemplary embodiment, in order to make a setting for the keyboard 20, the keyboard 20 is attached to the display surface side of the information terminal 1 using a magnet disposed on a back surface of the keyboard 20.

In the exemplary embodiment, the brightness may be set for each region in consideration of the arrangement of the keyboard 20.

The infrared sensors 106 (see FIG. 4) are provided on the display surface side of the information terminal 1. Therefore, when a setting for darkening a region that is not continuously observed by the user is valid in the exceptional rules, the brightness of the region covered with the keyboard 20 can be set to dark.

Eighth Exemplary Embodiment

The above-described exemplary embodiments describe that the deformable display surface includes one touch panel 4 (see FIGS. 1A and 1B).

The present exemplary embodiment will describe a case where the display surface of the deformable information terminal includes plural touch panels 4.

Figures 36A, 36B:
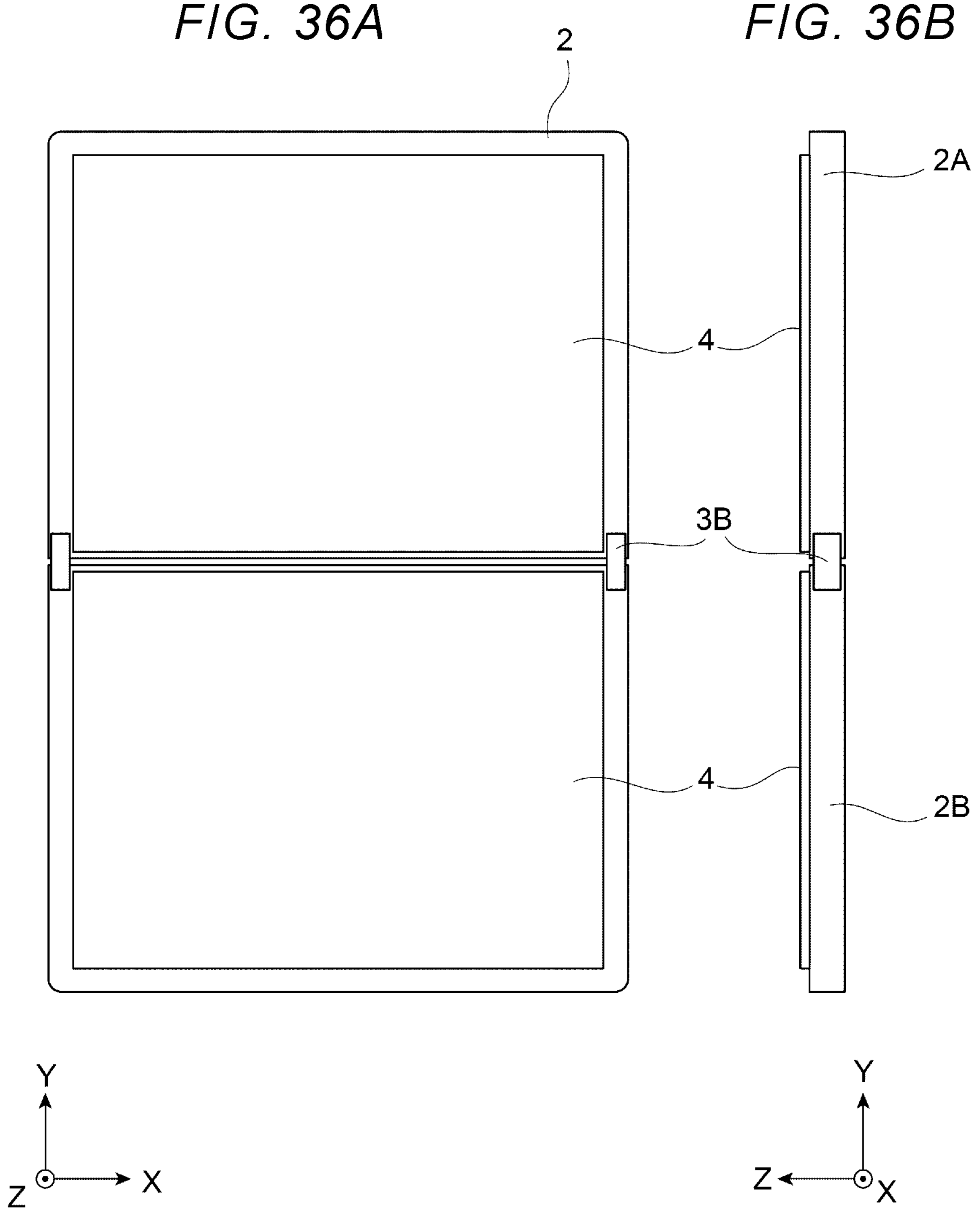
FIGS. 36A and 36B are diagrams illustrating an example of an external configuration of an information terminal used in an eighth exemplary embodiment.

FIGS. 36A and 36B are diagrams illustrating an example of an external configuration of an information terminal 1F used in an eighth exemplary embodiment. FIG. 36A is a front view of the information terminal 1F. FIG. 36B is a side view of the information terminal 1F. In FIGS. 36A and 36B, corresponding reference numerals are allocated to elements that correspond to the elements illustrated in FIGS. 1A and 1B. The information terminal 1F is also an example of the information processing device.

In the information terminal 1F used in the present exemplary embodiment, the display surface includes two touch panels 4. One continuous image may be displayed on these two touch panels.

In the information terminal 1F, the body panel 2A and the body panel 2B are rotatably attached to a hinge 3B. A rotation shaft for rotatably attaching the body panel 2A and a rotation shaft for rotatably attaching the body panel 2B are built in the hinge 3B according to the present exemplary embodiment. Therefore, the touch panel 4 can be folded inward, and the touch panel 4 can be folded outward.

The body panel 2A, the body panel 2B, and the touch panel 4 used in the present exemplary embodiment all have high rigidity and do not deform themselves. Each of the body panel 2A, the body panel 2B, and the touch panel 4 may be a deformable member that does not include the hinge 3B as described in the third exemplary embodiment.

The brightness may be set independently for each touch panel 4. Alternatively, plural regions may be set on one touch panel 4, and the brightness may be set for each region as in the other exemplary embodiments described above.

Further alternatively, a region whose brightness is to be set may be set so as to extend over the two touch panels 4, and brightness may be set separately for the set region and other regions around the set region. The example of the region setting here corresponds to the setting for the three regions illustrated in FIG. 11.

Other Exemplary Embodiments

The description is made on the exemplary embodiments of the present disclosure. It is noted that the technical scope of the present disclosure is not limited to the scope described in the above-described exemplary embodiments. It is apparent from the recitation of the claims that various modifications or improvements made to the exemplary embodiments described above are also included in the technical scope of the present disclosure.

For example, the organic EL display is used for the touch panel 4 in the above-described described exemplary embodiments. Alternatively, a liquid crystal display or other display devices may be used. In a case where the liquid crystal display is employed, brightness of a region on a display surface may be adjusted by adjusting luminance of a backlight or luminance of pixels. Other display devices include, for example, an electronic paper. In a case where the electronic paper is employed, for example, a tone range and a contrast range used for displaying information may be switched for each region.

The above-described exemplary embodiments describe that the touch panel 4 is provided on one surface of the body 2. Alternatively, the touch panels 4 may be provided on both surfaces of the body 2. In this case, the brightness may be set for each of regions in the touch panel 4 on one surface and regions in the touch panel 4 on the other surface.

In the above-described exemplary embodiments, the brightness is set for each region before the information terminal 1 (see FIGS. 1A and 1B) is deformed. Alternatively, the screen 201A (see FIG. 12) that receives the brightness setting for each region may be displayed on the display surface after the information terminal 1 is deformed. When the brightness is set after the information terminal 1 is deformed, the regions may be presented in accordance with a shape of the deformed display surface.

In the above-described exemplary embodiments, the brightness is set for each region before the information terminal 1 (see FIGS. 1A and 1B) is deformed. A range of a region where brightness preset by the user may be adjusted in accordance with the shape after deformation under control of the CPU 101 (see FIG. 4).

The user may select whether to enable a function of adjusting the region where the brightness that is set in accordance with the shape after deformation is used.

In the above-described exemplary embodiments, the information terminal 1 (see FIGS. 1A and 1B) including the touch panel 4 having the film sensor on a surface of the display has been described. It is noted that the touch panel 4 may be omitted. For example, the information terminal 1 may use a display having no film sensor.

In the above-described exemplary embodiments, the infrared sensor 106 is used to detect the region that is placed on a surface such as a desk or a region, covered with another object, of the touch panel 4. Alternatively, an acceleration sensor or a gyroscope sensor may be used to determine an orientation or a posture with which the information terminal 1 is used, and a result of the determination may be used to determine the region that can be observed by the user and the region that cannot be observed by the user.

In the exemplary embodiments described above, the term "processor" refers to hardware in a broad sense. Examples of the processor includes general processors (e.g., CPU), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical apps, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:

a processor configured to receive a brightness setting for each region of a plurality of regions of a deformable continuous display surface through a user instruction, adjacent ones of the plurality of regions being divided by a movable display region dividing line, an initial position of the movable display region dividing line being set taking into consideration a position of a hinge within the display surface, the processor further configured to move the movable display region dividing line in response to a touch operation from a user.

2. The information processing device according to claim 1, wherein the processor is configured to receive the user instruction through a screen configured to receive the brightness setting.

3. The information processing device according to claim 2, wherein the processor is configured to present, on the screen, a region candidate that is determined in accordance with a state of deformation.

4. The information processing device according to claim 3, wherein the processor is configured to receive a correction of ranges of the regions presented as the candidate.

5. The information processing device according to claim 3, wherein the processor is configured to receive a change in the number of the regions presented as the candidate.

6. The information processing device according to claim 3, wherein the processor is configured to receive a correction of positions of the regions presented as the candidate.

7. The information processing device according to claim 2, wherein the processor is configured to receive designation of brightness preference from among (i) brightness set by a user and (ii) brightness set by the processor.

8. The information processing device according to claim 7, wherein the processor is configured to receive a condition under which the brightness set by the processor is given a preference over the brightness set by the user.

9. The information processing device according to claim 1, wherein the processor is configured to control the brightness of each region in accordance with a specific condition when a usage mode of the display surface in a deformed state satisfies a predetermined condition.

10. The information processing device according to claim 9, wherein the processor is configured to reduce brightness of a region not observed by a user, relative to other regions.

11. The information processing device according to claim 9, wherein the processor is configured to control the brightness of each region in the deformed state in accordance with a relationship between (i) a direction of a face or a line of sight of a user detected by a detector of a housing including the display surface and (ii) a position of the display surface.

12. The information processing device according to claim 9, wherein the processor is configured to control brightness of a region where an image used to receive an input from a user is displayed to be lower than brightness of a region where an image used to output information to the user is displayed.

13. The information processing device according to claim 9, wherein the processor is configured to control brightness of a region where an image used to output information to a user is displayed to be higher than brightness of a region where an image used to receive an input from the user is displayed.

14. The information processing device according to claim 1, wherein the display surface is a display surface of a foldable display device.

15. A non-transitory computer readable medium storing a program that causes a computer to execute information processing, the information processing comprising:

receiving a brightness setting for each region of a plurality of regions of a deformable continuous display surface through a user instruction, adjacent ones of the plurality of regions being divided by a movable display region dividing line, an initial position of the movable display region dividing line being set taking into consideration a position of a hinge within the display surface; and moving the movable display region dividing line in response to a touch operation from a user.

16. An information processing device comprising:

means for receiving a brightness setting for each region of a plurality of regions of a deformable continuous display surface through a user instruction, adjacent ones of the plurality of regions being divided by a movable display region dividing line, an initial position of the movable display region dividing line being set taking into consideration a position of a hinge within the display surface; and means for moving the movable display region dividing line in response to a touch operation from a user.

* * * * *